(12) United States Patent
Omori et al.

(10) Patent No.: US 11,721,148 B2
(45) Date of Patent: Aug. 8, 2023

(54) AUTHORIZATION SYSTEM, MANAGEMENT SERVER AND AUTHORIZATION METHOD

(71) Applicant: Nippon Telegraph and Telephone Corporation, Tokyo (JP)

(72) Inventors: Yoshihiko Omori, Tokyo (JP); Takao Yamashita, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 163 days.

(21) Appl. No.: 17/431,894

(22) PCT Filed: Feb. 14, 2020

(86) PCT No.: PCT/JP2020/005837
§ 371 (c)(1),
(2) Date: Aug. 18, 2021

(87) PCT Pub. No.: WO2020/170976
PCT Pub. Date: Aug. 27, 2020

(65) Prior Publication Data
US 2022/0172533 A1 Jun. 2, 2022

(30) Foreign Application Priority Data
Feb. 22, 2019 (JP) .................................. 2019-030849

(51) Int. Cl.
*G07C 9/00* (2020.01)
*H04W 12/069* (2021.01)

(52) U.S. Cl.
CPC ...... *G07C 9/00571* (2013.01); *H04W 12/069* (2021.01)

(58) Field of Classification Search
None
See application file for complete search history.

(56) References Cited

U.S. PATENT DOCUMENTS 10,745,943 B1 * 8/2020 Jonak ...................... E05B 67/02

OTHER PUBLICATIONS

Omori et al., "A study on authorization for the use of services among many users on the internet," 2018 IEICE Communication Society Conference, Sep. 11, 2018, p. 86, 7 pages (with English translation).

(Continued)

*Primary Examiner* — K. Wong
(74) *Attorney, Agent, or Firm* — Fish & Richardson P.C.

(57) ABSTRACT

[Problem] In guest invitation for a smart lock, a burden on an owner on invitation is reduced and impersonation or invitation of an unintended third party is prevented.
[Solution] A representative guest terminal 102 requesting unlocking of a smart lock 400 generates authentication information referred to at the time of a request for unlocking, imparts a signature to the authentication information, and transmits the authentication information to an owner terminal 101. The owner terminal 101 verifies a signature of the representative guest terminal 102, imparts a signature to the authentication information, and transmits the authentication information to a management server 200. The management server 200 verifies the signatures of the representative guest terminal 102 and the owner terminal 101, stores the owner terminal 101 and the representative guest terminal 102 in association with each other, and stores the authentication information and the representative guest terminal 102 in association with each other. When the management server 200 receives an unlocking request from the smart lock 400 and successfully authenticates the unlocking request by referring to the stored authentication information, the smart lock 400 is unlocked.

19 Claims, 12 Drawing Sheets

(56) References Cited

OTHER PUBLICATIONS

Omori et al., "A study on transferring authorization privilege for granting permission to use services to multiple users," IEICE Technical Report, Mar. 2019, 118(466):252-258, 19 pages (with English translation).

Qrio.Me, "Reliability—Qrio Smart Lock," retrieved on Jan. 23, 2019, retrieved from URL <https://qrio.me/smartlock/q-sll/security/>, 7 pages (with English translation).

* cited by examiner

AUTHORIZATION SYSTEM, MANAGEMENT SERVER AND AUTHORIZATION METHOD

CROSS-REFERENCE TO RELATED APPLICATIONS

This application is a National Stage application under 35 U.S.C. § 371 of International Application No. PCT/JP2020/005837, having an International Filing Date of Feb. 14, 2020, which claims priority to Japanese Application Serial No. 2019-030849, filed on Feb. 22, 2019. The disclosure of the prior application is considered part of the disclosure of this application, and is incorporated in its entirety into this application.

TECHNICAL FIELD

The present invention relates to an authorization system, a management server, and an authorization method for authorizing a terminal of a guest to unlock a smart lock.

BACKGROUND ART

One example of an Internet of things (IoT) device is a smart lock (see Non Patent Literature 1). For example, an owner installs the smart lock at a front entrance of a house. Subsequently, the owner issues an invitation universal resource locator (URL) for obtaining a duplicate key to a family member or guest, and the family member or guest can unlock the smart lock using a smartphone in which the duplicate key is stored, or the owner can remotely unlock the smart lock. Use time can be limited for a duplicate key for guests.

Guests are not limited to friends or acquaintances, and an employee dispatched by a service provider that provides services such as housework or babysitting (hereinafter also referred to as a service provider) may also be considered as a guest.

CITATION LIST

Non Patent Literature

Non Patent Literature 1: Qrio Lock, [online], [retrieved on Feb. 13, 2019], Internet <URL: https://qrio.me/smartlock>

SUMMARY OF THE INVENTION

Technical Problem

When inviting guests, an owner acquires an invitation URL for each guest and transmits the invitation URL to terminals of the guests. When a guest is a friend, the acquired invitation URL may be transmitted by e-mail or a social networking service (SNS).
However, when a guest is an employee of a service provider, there are many transmission destinations, and time and effort required to acquire and transmit the invitation URL increases, which is a burden on the owner. Further, employees of service providers are often unfamiliar people, which increases time and effort to confirm other parties and increases the burden on the owner. Further, it is difficult to sufficiently confirm the identity of a guest, and there is a risk of impersonation.
In addition, the invitation URL may be peeped at or shared by a third party from a guest terminal, and a third party not intended by the owner is likely to acquire a duplicate key.

The present invention has been devised in view of the above background, and an object of the present invention is to provide an authorization system, a management server, and an authorization method capable of reducing a burden of invitation on an owner and preventing impersonation or invitation of an unintended third party even when the number of guests to be invited increases or a frequency of invitations increases.

Means For Solving the Problem

In order to solve the above-described problems, an invention according to claim 1 is an authorization system comprising a smart lock, an owner terminal used by a manager of the smart lock, a child guest terminal used by a child guest to request unlocking of the smart lock, a representative guest terminal used by a representative guest to request unlocking of the smart lock, and a management server, wherein the representative guest terminal is configured to generate authentication information referred to when the unlocking of the smart lock is requested, impart a signature to the authentication information, and transmit the authentication information and the signature to the owner terminal as a request for authorization and registration of the unlocking from the representative guest terminal, the owner terminal is configured to, upon successfully verifying the signature included in the information received from the representative guest terminal and receiving information for approving the authorization and registration of unlocking for the representative guest terminal by the manager, impart a signature to the authentication information of the representative guest terminal, and transmit the information included in the received request for authorization and registration of unlocking and the signature of the owner terminal for the authentication information of the representative guest terminal to the management server, the management server is configured to, upon successfully verifying the signatures included in the information received from the owner terminal, store the owner terminal and the representative guest terminal in association with each other and store the authentication information of the representative guest terminal and the representative guest terminal in association with each other, and refer to the authentication information associated with the representative guest terminal to determine whether or not the unlocking request is an unlocking request transmitted by the representative guest terminal when the unlocking request transmitted by the representative guest terminal requesting the unlocking is received from the smart lock, and transmit a result of the determination to the smart lock, and the smart lock is configured to be unlocked when the management server determines that the unlocking request is the unlocking request transmitted by the representative guest terminal.

An invention according to claim 11 is an authorization method in an authorization system comprising a smart lock, an owner terminal used by a manager of the smart lock, a child guest terminal used by a child guest to request unlocking of the smart lock, a representative guest terminal used by a representative guest to request unlocking of the smart lock, and a management server, the method including: at the representative guest terminal, generating authentication information referred to when the unlocking of the smart lock is requested, imparting a signature to the authentication information, and transmitting the authentication information and the signature to the owner terminal as a request for authorization and registration of the unlocking from the representative guest terminal, at the owner terminal, upon successfully verifying the signature included in the information received from the representative guest terminal and receiving information for approving the authorization and registration of unlocking for the representative guest terminal by the manager, imparting a signature to the authentication information of the representative guest terminal, and transmitting the information included in the request for authorization and registration of unlocking received from the representative guest terminal and the signature of the owner terminal for the authentication information of the representative guest terminal to the management server, at the management server, upon successfully verifying the signatures included in the information received from the owner terminal, storing the owner terminal and the representative guest terminal in association with each other, and storing the authentication information of the representative guest terminal and the representative guest terminal in association with each other, and referring to the authentication information associated with the representative guest terminal to determine whether or not the unlocking request is an unlocking request transmitted by the representative guest terminal when the unlocking request transmitted by the representative guest terminal requesting the unlocking is received from the smart lock, and transmitting a result of the determination to the smart lock, and at the smart lock, unlocking when the management server determines that the unlocking request is the unlocking request transmitted by the representative guest terminal.

With such a configuration, the authorization system performs authorization and registration of the representative guest terminal approved by the owner (invitation of the representative guest and registration of the representative guest terminal). Thus, the representative guest can unlock the smart lock and enter the room using the terminal of the representative guest.

Further, there is no duplicate key of the smart lock such as an invitation URL of an existing technology, the duplicate key cannot be stolen or passed to a third party, and unlocking can be prevented from being authorized to an unintended terminal.

An invention according to claim 2 is the authorization system according to claim 1, wherein the child guest terminal generates the authentication information referred to when the unlocking of the smart lock is requested, imparts a signature to the authentication information, and transmits the authentication information and the signature to the representative guest terminal, the representative guest terminal, upon successfully verifying the signatures included in the information received from the child guest terminal, imparts a signature to the authentication information of the child guest terminal, and transmits the authentication information of the child guest terminal, the signature of the child guest terminal for the authentication information, and the signature of the representative guest terminal for the authentication information, in addition to the request for authorization and registration of unlocking from the representative guest terminal, to the owner terminal as a request for authorization and registration of unlocking by the child guest terminal, the owner terminal, upon successfully verifying the signatures included in the request for authorization and registration of unlocking by the child guest terminal received from the representative guest terminal and receiving information for approving the authorization and registration of unlocking by the child guest terminal by the manager, imparts a signature to the authentication information of the child guest terminal, and transmits the information included in the request for authorization and registration of unlocking by the child guest terminal received from the representative guest terminal and the signature of the owner terminal for the authentication information of the child guest terminal to the management server together with information included in the request for authorization and registration of unlocking from the representative guest terminal and the signature of the owner terminal for the authentication information of the representative guest terminal, the management server, upon successfully verifying the signatures included in the information received from the owner terminal, stores the representative guest terminal and the child guest terminal in association with each other, stores the authentication information of the child guest terminal and the child guest terminal in association with each other, refers to the authentication information associated with the child guest terminal to determine whether or not the unlocking request is an unlocking request transmitted by the child guest terminal when the unlocking request transmitted by the child guest terminal requesting unlocking is received from the smart lock, and transmits a result of the determination to the smart lock, and the smart lock is unlocked when the management server determines that the unlocking request is the unlocking request transmitted by the child guest terminal.

With such a configuration, the authorization system performs authorization and registration of the child guest terminal requested by the representative guest terminal and approved by the owner (invitation of the child guest and registration of the child guest terminal). Thus, the owner can authorize the invitation of child guests through the representative guest without authorizing individual child guest terminals. The burden of confirmation, authorization and registration of individual child guests on the owner can be reduced by a trusted representative guest.

An invention according to claim 3 is the authorization system according to claim 1, wherein the owner terminal generates an authorization token indicating that the request for the authorization and registration of unlocking to the management server is authorized to the representative guest terminal and imparts a signature to the authorization token, and transmits the authorization token with the signature to the management server, the management server verifies the signature imparted to the authorization token received from the owner terminal, and stores the authorization token and the representative guest terminal in association with each other, the child guest terminal generates the authentication information referred to when the unlocking of the smart lock is requested, imparts a signature to the authentication information, and transmits the authentication information and the signature to the representative guest terminal, the representative guest terminal, upon successfully verifying the signatures included in the information received from the child guest terminal, imparts a signature to the authentication information of the child guest terminal, and transmits the authentication information of the child guest terminal, the signature of the child guest terminal for the authentication information, and the signature of the representative guest terminal for the authentication information to the management server as a request for authorization and registration of unlocking by the child guest terminal, and the management server, upon successfully verifying the signature included in the information received from the representative guest terminal and confirming that the authorization token associated with the representative guest terminal is stored, stores the representative guest terminal and the child guest terminal included in the request for authorization and registration of unlocking in association with each other, and stores the authentication information of the child guest terminal and the child guest terminal in association with each other.

Thus, the authorization token can be registered in the management server, and the representative guest terminal can directly request the management server to perform authorization and registration of unlocking of the child guest terminal without going through the owner terminal. Thus, it is possible to reduce the burden of approval of the child guest invitation on the owner. Further, the management server can manage which representative guest terminal the authorization token has been issued to.

An invention according to claim 4 is the authorization system according to claim 1, wherein the owner terminal generates an authorization token indicating that the request for the authorization and registration of unlocking to the management server is authorized to the representative guest terminal and imparts a signature to the authorization token, and transmits the authorization token with the signature to the representative guest terminal, the representative guest terminal verifies the signature imparted to the authorization token received from the owner terminal, and stores the authorization token, the child guest terminal generates the authentication information referred to when the unlocking of the smart lock is requested, imparts a signature to the authentication information, and transmits the authentication information and the signature to the representative guest terminal, the representative guest terminal, upon successfully verifying the signature included in the information received from the child guest terminal, imparts a signature to the authentication information of the child guest terminal, and transmits the authentication information of the child guest terminal, the signature of the child guest terminal for the authentication information, the signature of the representative guest terminal for the authentication information, and the authorization token to which the signature is imparted to the management server as a request for authorization and registration of unlocking by the child guest terminal, and the management server, upon successfully verifying the signatures included in the information received from the representative guest terminal and successfully verifying that the representative guest terminal authorized by the authorization token is a representative guest terminal requesting the authorization and registration of unlocking, stores the representative guest terminal and the child guest terminal included in the request for authorization and registration of unlocking in association with each other, and stores the authentication information of the child guest terminal and the child guest terminal in association with each other.

Thus, the representative guest terminal can directly request the management server to perform authorization and registration of unlocking by the child guest terminal by transmitting the authorization token to the management server without going through the owner terminal. Thus, it is possible to reduce the burden of approval of the child guest invitation on the owner.

An invention according to claim 5 is the authorization system according to claim 3 or 4, wherein the authorization token includes cancellation of the authorization and registration of unlocking by the child guest terminal, the representative guest terminal requests the cancellation of the authorization and registration from the child guest terminal, and the management server, upon successfully verifying that the authorization token corresponding to the representative guest terminal is stored, or successfully verifying a signature imparted to the authorization token corresponding to the representative guest terminal, the authorization token being included in the request for cancellation of the authorization and registration, deletes the authentication information of the child guest terminal associated with the representative guest.

Thus, the representative guest terminal can cancel the authorization and registration of the child guest terminal of which the authorization and registration have been requested by the representative guest terminal.

An invention according to claim 6 is the authorization system according to claim 3 or 4, wherein the authorization token includes either of the maximum number of child guest terminals for which authorization and registration of unlocking are allowed and a period in which registration is allowed, and the management server receives the request for authorization and registration of unlocking up to the maximum number from the representative guest terminal when the authorization token includes the maximum number, and receives the request for authorization and registration of unlocking when the authorization token includes the period in which registration is allowed and there is the request from the representative guest terminal in the period in which registration is allowed.

Thus, the manager can limit the number of child guest terminals that can be registered by the representative guest terminal and the period in which registration is allowed.

An invention according to claim 7 is the authorization system according to claim 3 or 4, wherein the authorization token includes a date and time at which unlocking is authorized, and the management server stores the authentication information of the child guest terminal requesting authorization and registration of the unlocking and the child guest terminal in association with the date and time at which unlocking is authorized when storing the authentication information of the child guest terminal requesting authorization and registration of the unlocking and the child guest terminal in association with each other, and determines whether or not a transmission time of the unlocking request is included in the date and time at which unlocking is authorized, the date and time being stored in association with the child guest terminal, when determining whether or not the unlocking request is an unlocking request that the child guest terminal transmits.

Thus, the manager can limit a date and time when unlocking is allowed for the child guest terminal registered by the representative guest terminal.

An invention according to claim 8 is the authorization system according to claim 3 or 4, wherein, when the management server receives, from the representative guest terminal, a request for authorization and registration of unlocking by the child guest terminal, the management server inquires of the owner terminal about approval or disapproval of the authorization and registration of unlocking before storing the authentication information of the child guest terminal and the child guest terminal in association with each other, the owner terminal receives information indicating approval or disapproval of the authorization and registration of unlocking from the manager, and transmits the approval or disapproval to the management server, and when the management server receives the approval, the management server stores the authentication information and the child guest terminal in association with each other.

Thus, the management server receives a request for invitation of the child guest from the representative guest terminal, and authorizes and registers unlocking of the smart lock by the child guest terminal after the approval of the owner is obtained. Thus, even when a child guest is approved by the representative guest, it is possible to prevent invitation of the child guest not approved by the owner.

An invention according to claim 9 is the authorization system according to claim 3 or 4, wherein, when the management server receives, from the representative guest terminal, a request for authorization and registration of unlocking by the child guest terminal, the management server stores the representative guest terminal and the child guest terminal in association with each other, stores the authentication information of the child guest terminal and the child guest terminal in association with each other, and then notifies the owner terminal of the authorization and registration of unlocking, the owner terminal receives information indicating cancellation or non-cancellation of the authorization and registration of unlocking from the manager, and transmits the cancellation or non-cancellation to the management server, and when the management server receives the cancellation, the management server deletes the authentication information stored in association with the child guest terminal.

Thus, the management server receives a request for invitation of a child guest from the representative guest terminal, and deletes the authorization and registration when the owner instructs the management server to cancel the authorization and registration even after the unlocking of the smart lock by the child guest terminal is registered and authorized. Thus, even when a child guest is approved by the representative guest, the invitation of the child guest not approved by the owner can be cancelled.

An invention according to claim 10 is a management server of an authorization system comprising a smart lock, an owner terminal used by a manager of the smart lock, a child guest terminal used by a child guest to request unlocking of the smart lock, a representative guest terminal used by a representative guest to request unlocking of the smart lock, and a management server, wherein the management server configured to receive authentication information referred to when the representative guest terminal requests unlocking of the smart lock, a signature of the representative guest terminal and a signature of the owner terminal for the authentication information from the owner terminal, upon successfully verifying the signatures included in the information received from the owner terminal, store the owner terminal and the representative guest terminal in association with each other and store the authentication information of the representative guest terminal and the representative guest terminal in association with each other, refer to the authentication information associated with the representative guest terminal to determine whether or not the unlocking request is an unlocking request transmitted by the representative guest terminal when the unlocking request transmitted by the representative guest terminal requesting the unlocking is received from the smart lock, and transmit a result of the determination to the smart lock.

With such a configuration, the management server authorizes and registers the representative guest terminal approved by the owner. Thus, the representative guest can unlock the smart lock and enter the room using a terminal of the representative guest.

Further, there is no duplicate key of the smart lock such as an invitation URL of an existing technology, the duplicate key cannot be stolen or passed to a third party, and unlocking can be prevented from being authorized to an unintended terminal.

Effects of the Invention

According to the present invention, it is possible to provide an authorization system, a management server, and an authorization method capable of reducing a burden of invitation on an owner and preventing impersonation or invitation of an unintended third party even when the number of guests to be invited increases or a frequency of invitations increases.

EFFECTS OF THE INVENTION

DESCRIPTION OF EMBODIMENTS

Overall Configuration of Authorization System

Figure 1:
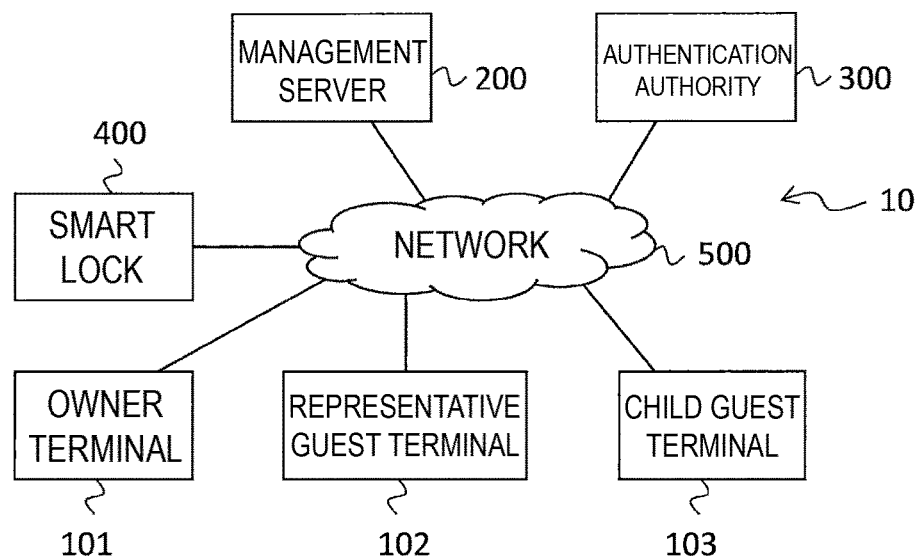
FIG. 1 is a diagram illustrating an overall configuration of an authorization system according to the present embodiment.

Hereinafter, an authorization system in modes for carrying out the present invention (embodiments) will be described. FIG. 1 is a diagram illustrating an overall configuration of an authorization system 10 according to the present embodiment. The authorization system 10 includes a smart lock 400, an owner terminal 101 that is a terminal of an owner (manager) of the smart lock 400, a representative guest terminal 102 that is a terminal of a representative guest, a child guest terminal 103 that is a terminal of a child guest, and a management server 200 that are connected by a network 500. The authorization system 10 uses an authentication authority 300 to manage an encryption key.

The owner terminal 101, the representative guest terminal 102, and the child guest terminal 103 are also collectively referred to as a terminal (a terminal 100 illustrated in FIG. 2 that will be described below). Further, the owner terminal 101, the representative guest terminal 102, the child guest terminal 103, and the smart lock 400 can communicate with each other by near-field wireless communication. Examples of typical near-field wireless communications include Bluetooth (registered trademark), near-field communication (NFC), and infrared communication.

Communication of the terminal with the smart lock 400 and the management server 200 is protected, and eavesdropping, tampering, or impersonation of communication data does not occur. Similarly, the near-field wireless communication is protected, and eavesdropping, tampering, or impersonation of communication data do not occur.

Overview of Authorization System

Hereinafter, an overview of the authorization system 10 will be described. The smart lock 400 is a key installed in a door of a front entrance or a room. When the owner of the smart lock 400 authorizes a representative guest or a child guest to enter the room, information relevant to a terminal of the representative guest or the child guest is registered in the management server 200. When the information is registered, the representative guest or the child guest can enter the room. Registration of the representative guest or the child guest by the owner is also called invitation of the representative guest or the child guest.

When the representative guest or the child guest enters the room, the representative guest or the child guest instructs a terminal of the representative guest or the child guest to request authentication so that the smart lock 400 is unlocked. When the information relevant to the terminal is registered in the management server 200, the smart lock 400 succeeds in authenticating the representative guest terminal 102 or the child guest terminal 103 and is unlocked so that the representative guest or the child guest can enter the room.

When the owner authorizes the representative guest to enter the room, the owner and the representative guest meet each other and the owner terminal 101 and the representative guest terminal 102 communicate with each other by near-field wireless communication so that the information relevant to the representative guest terminal 102 is registered in the management server 200.

The child guest is authorized to enter the room through the representative guest.

Specifically, the representative guest meets the child guest, the representative guest terminal 102 and the child guest terminal 103 communicate with each other by near-field wireless communication, and the information relevant to the child guest terminal 103 is stored in the representative guest terminal 102. Subsequently, the representative guest meets the owner, the owner terminal 101 and the representative guest terminal 102 communicate with each other by near-field wireless communication, and the information relevant to the child guest terminal 103 is registered in the management server 200 by the owner terminal 101.

Further, the information relevant to the child guest terminal 103 is registered in the management server 200 using the authorization token by the representative guest terminal 102 without the representative guest meeting the owner.

As described above, the representative guest obtains authorization for room entry of the child guest on behalf of the child guest instead of each child guest obtaining authorization for room entry from the owner. In this way, it is possible for the owner to impart authorization for room entry without meeting each child guest, which reduces a burden on the owner. The representative guest can also obtain authorization for room entry of a plurality of child guests at once, which reduces a burden on both the owner and the representative guest. Further, when the authorization token is used, the representative guest can register the child guest terminal 103 without meeting the owner, which reduces a burden on both the owner and the representative guest.

Hereinafter, a configuration of the terminal, a configuration of the management server 200, and data communication between the terminal or the management server 200 and the smart lock 400 will be described in order to describe how authorization for room entry (authorization and registration of unlocking and invitation of the child guest or the representative guest) or unlocking is performed.

Configuration of Terminal

Figure 2:
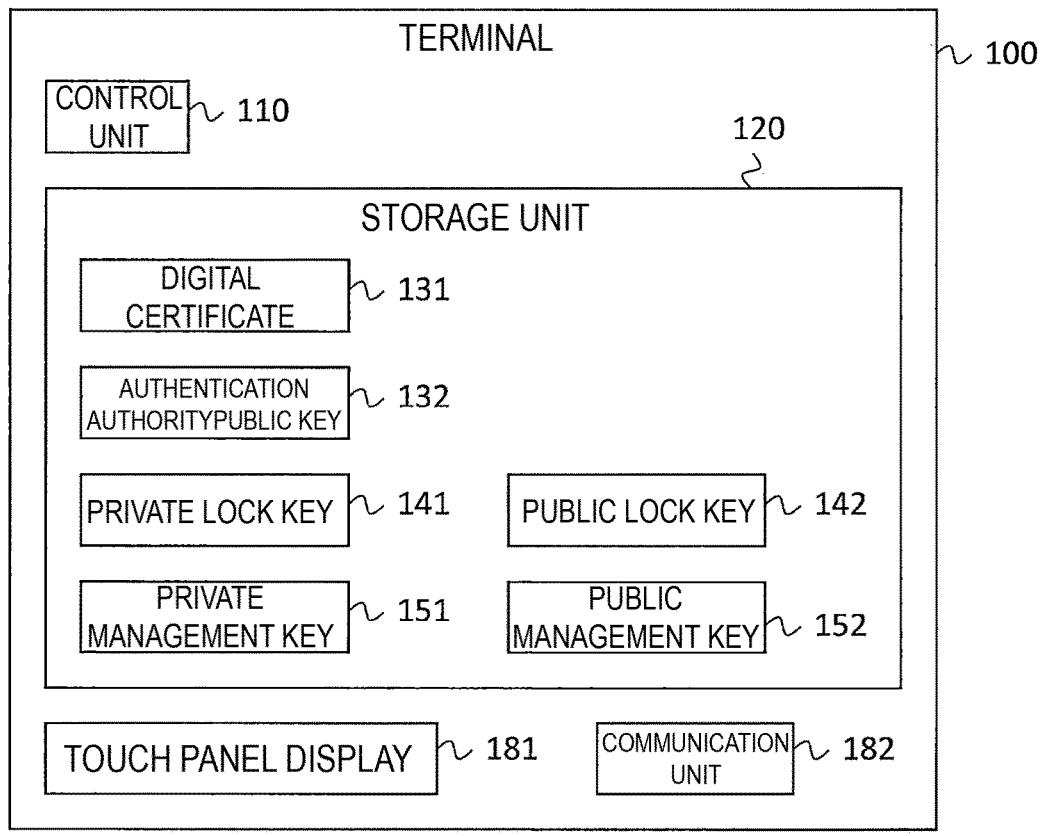
FIG. 2 is an overall configuration diagram of a terminal according to the present embodiment.

FIG. 2 is an overall configuration diagram of the terminal 100 according to the present embodiment. The terminal 100 is a portable computer such as a smartphone or a tablet terminal, and includes a control unit 110, a storage unit 120, a touch panel display 181, and a communication unit 182.

The control unit 110 is configured of a central processing unit (CPU) and executes various processes such as communication with the management server 200 or another terminal 100, encryption or decryption of data, signature, and signature verification, thereby causing the terminal 100 to function as a terminal of the authorization system 10. The touch panel display 181 is a display unit included in the terminal and receives operations of the owner, the representative guest, and the child guest who are users. The communication unit 182 performs transmission or reception of data in mobile phone communication or near-field wireless communication.

The storage unit 120 includes a random access memory (RAM), a read only memory (ROM), a flash memory, and the like. The storage unit 120 includes a digital certificate 131, an authentication authority public key 132, a private lock key 141, a public lock key 142, a private management key 151, and a public management key 152, in addition to a program that is executed by the control unit 110 and temporary data required for program execution.

The digital certificate 131 is a digital certificate issued by the authentication authority 300 to the terminal 100, and certifies that a public key included in the digital certificate 131 is a public key of the terminal 100. The digital certificate 131 is referred to when the control unit 110 verifies a signature (digital signature) imparted by using the private key. The digital certificate 131 is transmitted to another terminal 100, the management server 200, and the smart lock 400 together with the signature generated by the control unit 110. The terminal 100 or the management server 200 that has received the signature and the digital certificate 131 verifies the signature of the authentication authority 300 imparted to the digital certificate 131 using the authentication authority public key 132, acquires the public key of the terminal 100, and verifies the signature using this public key.

Verifying the signature of the authentication authority 300 imparted to the digital certificate 131 is also simply described as verifying the digital certificate 131. Further, verifying the digital certificate 131 and verifying the signature using the public key of the digital certificate 131 is also simply described as verifying the signature with the verification of the digital certificate 131 omitted.

The authentication authority public key 132 is a public key of the authentication authority 300 that is used for verification of the digital certificate 131. The digital certificate 131 is not issued to the owner terminal 101, and the digital certificate 131 is not present in the owner terminal 101.

The private lock key 141 and the public lock key 142 are keys that form a public key encryption pair, and are used for authentication of the terminal 100 by the smart lock 400 at the time of unlocking the smart lock 400.

The private management key 151 and the public management key 152 are keys that form a public key encryption pair, and are used for imparting a signature to the public lock key 142, imparting a signature to data to be transmitted to the management server 200, and verifying the signature. The private lock key 141 and the private management key 151 are encryption keys that are used for signature generation, and are required to have high confidentiality. Thus, the private lock key 141 and the private management key 151 may be stored in a tamper-resistant device.

The public key included in the digital certificate 131 is the public management key 152. When the digital certificate 131 is acquired, the control unit 110 generates the private management key 151 and the public management key 152 and transmits the public management key 152 to the authentication authority 300 to request the digital certificate 131. After the authentication authority 300 authenticates the terminal 100 or a user of the terminal 100, the authentication authority 300 issues a digital certificate 131 to which the signature of the authentication authority 300 is imparted, and transmits the digital certificate 131 to the terminal 100.

Configuration of Management Server

Figure 3:
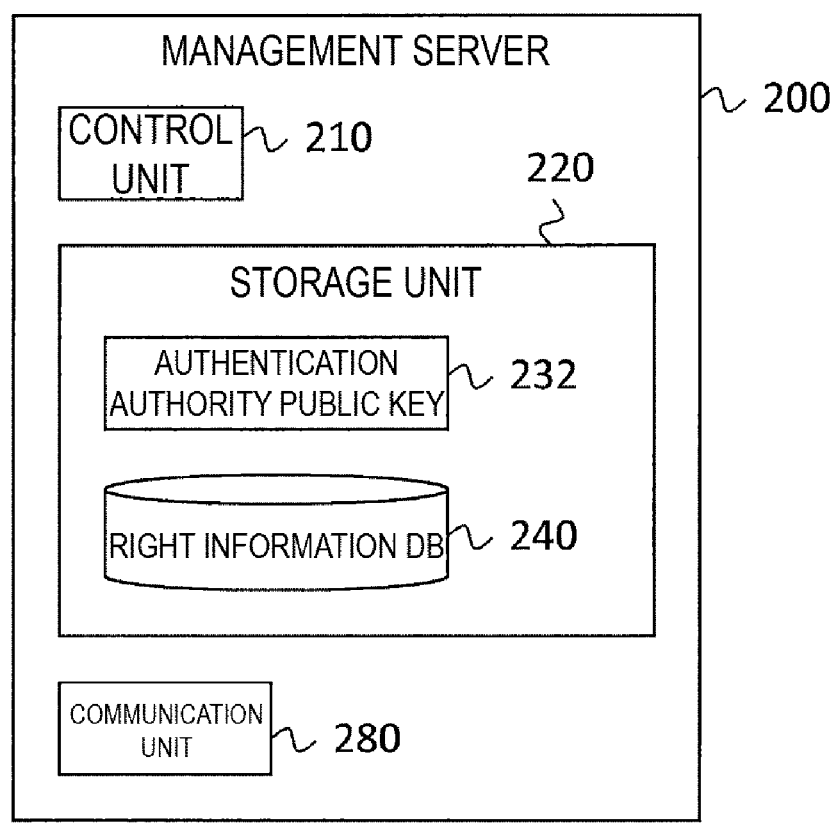
FIG. 3 is an overall configuration diagram of a management server according to the present embodiment.

FIG. 3 is an overall configuration diagram of the management server 200 according to the present embodiment. The management server 200 is a computer, and includes a control unit 210 configured of a CPU, a RAM or a solid state drive (SSD), a storage unit 220 configured of a hard disk drive, and a communication unit 280. The communication unit 280 transmits or receives communication data to or from the terminal 100 or the smart lock 400 via the network 500.

The storage unit 220 stores an authentication authority public key 232 and a right information database 240 to be described below (described as a right information DB (database) in FIG. 3; see FIG. 4 below), in addition to the program that is executed by the control unit 210 and the temporary data required for program execution. The authentication authority public key 232 is a public key of the authentication authority 300 and is used for verification of the digital certificate received by the management server 200.

Right Information Database

Figure 4:
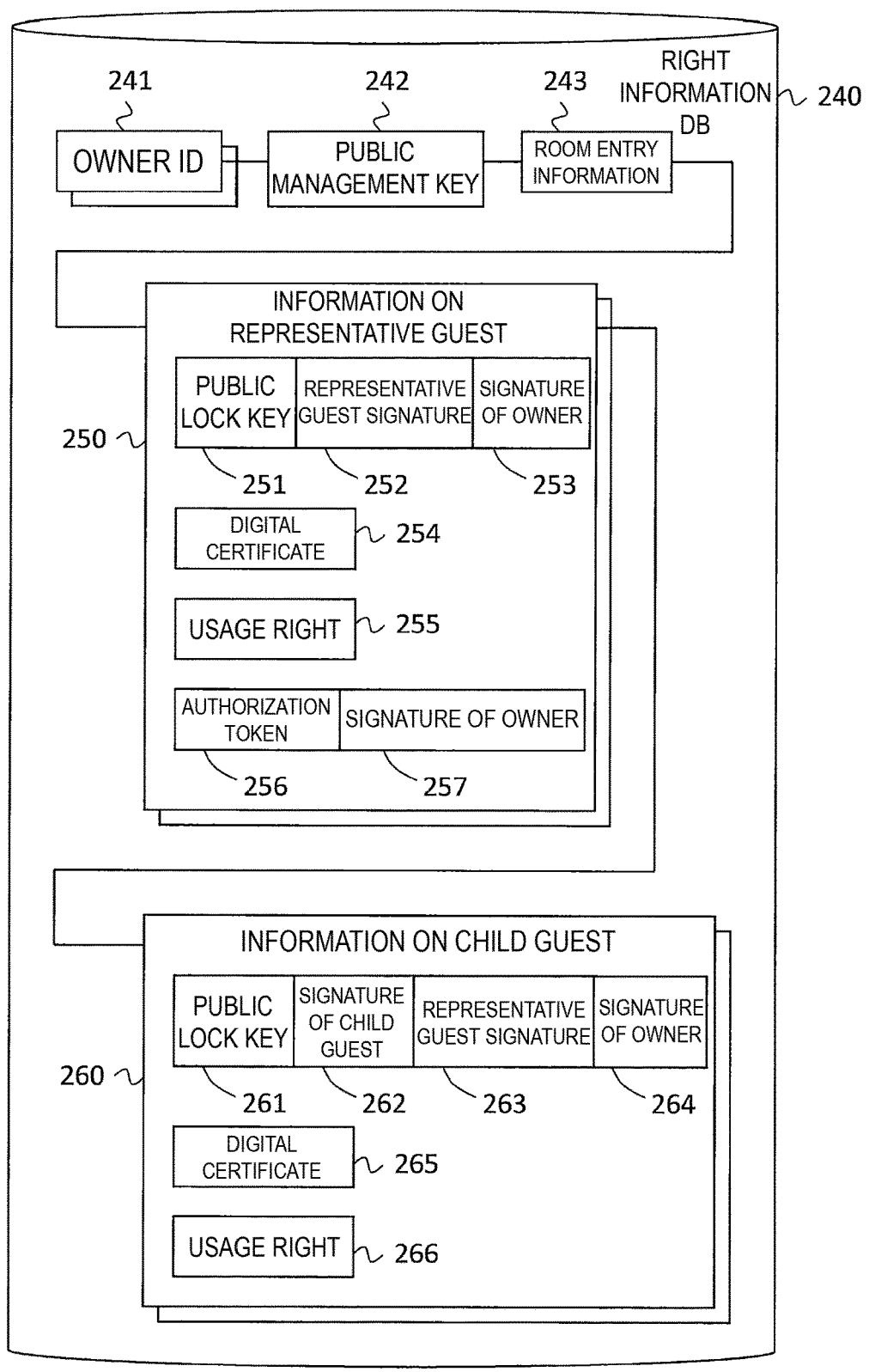
FIG. 4 is a data structure diagram of a right information database according to the present embodiment.

FIG. 4 is a data structure diagram of the right information database 240 according to the present embodiment. The right information database 240 stores owner identification information 241 (described as an owner ID (Identifier) in FIG. 4), a public management key 242, room entry information 243, information on the representative guest 250, and information on the child guest 260 in association with each other. The right information database 240 stores index information for high-speed search for smart lock identification information in digital certificates 254 and 265, public lock keys 251 and 261, and the room entry information 243, but this is not illustrated in FIG. 4.

The owner identification information 241 is information for identifying the owner of the smart lock 400. One or more pieces of owner identification information 241 are stored in the right information database 240.

The public management key 242 is the public management key 152 that is associated with the owner identification information 241 and is stored in the owner terminal 101 of the owner that is identified by the owner identification information 241. In some cases, one owner possesses a plurality of owner terminals 101, and a plurality of public management keys 242 are associated with the owner identification information 241. Hereinafter, the public management key 242 will be described as one public management key.

The room entry information 243 is information stored in association with the public management key 242, and includes information such as identification information relevant to the smart lock 400 (smart lock identification information) or a condition for unlocking the smart lock 400 (also referred to as an unlocking condition). The unlocking condition is information such as the period, day of the week, and time zone in which a parent guest or the child guest are authorized to enter the room.

The owner may own a plurality of smart locks 400, and a plurality of pieces of room entry information 243 may be associated with the public management key 242. Hereinafter, the room entry information 243 will be described as one piece of room entry information.

The information on the representative guest 250 is information that is stored in association with the room entry information 243. One or more pieces of information on the representative guest 250 are associated with one piece of room entry information 243. The information on the representative guest 250 includes the public lock key 251, the digital certificate 254, a usage right 255, and an authorization token 256.

The public lock key 251 is the public lock key 142 stored in the representative guest terminal 102, and a signature 252 of the representative guest and a signature 253 of the owner are imparted to the public lock key 251. The representative guest signature 252 is a signature for the public lock key 251 and is a signature that is generated by using the private management key 151 stored in the representative guest terminal 102. The signature 252 of the representative guest is verified by using the public key included in the digital certificate 254 to be described below.

The signature 253 of the owner is a signature for the public lock key 251 and the signature 252 of the representative guest, and is a signature generated by using the private management key 151 stored in the owner terminal 101. The signature 253 of the owner is verified using the public management key 242.

The digital certificate 254 is a digital certificate 131 stored in the representative guest terminal 102, and is used for verification of the signature 252 of the representative guest. In addition, the digital certificate 254 is also used for authentication of the representative guest terminal 102 at the time of unlocking the smart lock 400.

The usage right 255 is a right for the smart lock 400 authorized to the representative guest, and includes, for example, identification information of a room that the representative guest enters or a time when the representative guest is allowed to enter the room.

The authorization token 256 is a right of the representative guest authorized by the owner, and the signature 257 of the owner is imparted to the authorization token 256. The right of the representative guest includes registration of child guests or registration deletion.

The signature 257 of the owner is a signature for the authorization token 256, and is a signature generated by using the private management key 151 stored in the owner terminal 101. The signature 257 of the owner is verified using the public management key 242.

The information on the child guest 260 is information that is stored in association with the information on the representative guest 250. One or more pieces of information on the child guest 260 are associated with one piece of information on the representative guest 250. The information on the child guest 260 includes a public lock key 261, a digital certificate 265, and a usage right 266.

The public lock key 261 is a public lock key 142 stored in the child guest terminal 103, and a signature 262 of the child guest, a signature 263 of the representative guest, and a signature 264 of the owner are imparted to the public lock key 261.

The child guest signature 262 is a signature for the public lock key 261 and is a signature that is generated by using the private management key 151 stored in the child guest terminal 103. The signature 262 of the child guest is verified using the public key included in the digital certificate 265 to be described below.

The representative guest signature 263 is a signature for the public lock key 261 and the child guest signature 262, and is a signature that is generated by using the private management key 151 stored in the representative guest terminal 102. The signature 263 of the representative guest is verified using the public key included in the digital certificate 254 in the information on the representative guest 250.

The signature 264 of the owner is a signature for the public lock key 261, the signature 262 of the child guest, and the signature 263 of the representative guest, and is a signature generated by using the private management key 151 stored in the owner terminal 101. The signature 264 of the owner is verified using the public management key 242.

The digital certificate 265 is a digital certificate 131 stored in the child guest terminal 103, and is used for verification of the signature 262 of the child guest. In addition, the digital certificate 265 is also used for authentication of the child guest terminal 103 at the time of unlocking the smart lock 400.

The usage right 266 is a right for the smart lock 400 authorized to the child guest, and includes, for example, identification information of a room that the child guest enters or a time when the child guest is allowed to enter the room.

The information on the representative guest 250 and the information on the child guest 260 include the public lock keys 251 and 261 and the digital certificates 254 and 265, and are referred to when the signatures generated by the representative guest terminal 102 and the child guest terminal 103 are verified. Further, the public lock keys 251 and 261 and the digital certificates 254 and 265 are referred to as authentication information when the management server 200 authenticates the representative guest terminal 102 and the child guest terminal 103 at the time of unlocking the smart lock 400.

Process of Registering Smart Lock

Hereinafter, a process of registering the smart lock, a process of preparing for registration of the child guest terminal, a process of preparing for registration of a representative guest terminal, a process of registering the guest terminal, a process of unlocking the smart lock, and a process of additionally registering a child guest will be described. There is signature verification during processing, but in the following description, it is assumed that the signature verification is successful and the authenticity of a signature target can be confirmed. When the signature verification fails, the terminal that has transmitted the signature is notified of an error and processing is stopped.

Figure 5:
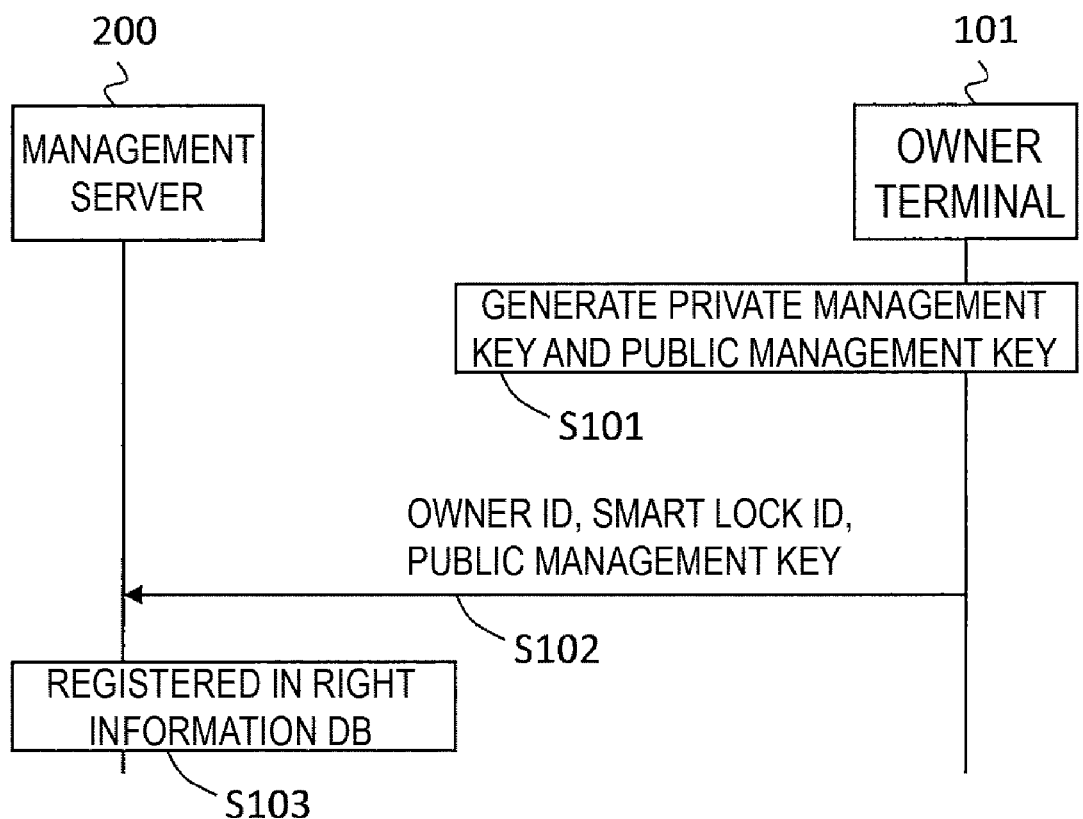
FIG. 5 is a sequence diagram illustrating a process of registering a smart lock in a management server according to the present embodiment.

FIG. 5 is a sequence diagram illustrating a process of registering the smart lock 400 in the management server 200 according to the present embodiment. The process of registering the smart lock is a process in which the owner registers the smart lock 400 and the owner in the management server 200.

In step S101, the owner terminal 101 generates a pair of the private management key 151 and the public management key 152.

In step S102, the owner terminal 101 transmits the owner identification information, the smart lock identification information, and the public management key 152 generated in step S101 to the management server 200, and applies for registration of the smart lock 400. Here, the communication between the owner terminal 101 and the management server 200 is protected, and tampering or impersonation of the communication data does not occur.

In step S103, the management server 200 registers the received owner identification information and the received public management key 152 as the owner identification information 241 and the public management key 242 of the right information database 240. The smart lock identification information is registered in the room entry information 243.

In step S102, the owner terminal 101 may transmit information on a door or room in which the smart lock 400 is installed. In step S103, the management server 200 registers these pieces of information in the room entry information 243.

When the process of registering the smart lock is executed, the owner identification information 241, the public management key 242 of the owner, and the smart lock information are stored in the management server 200 in association with each other.

Process of Preparing For Registration of Child Guest Terminals

Figure 6:
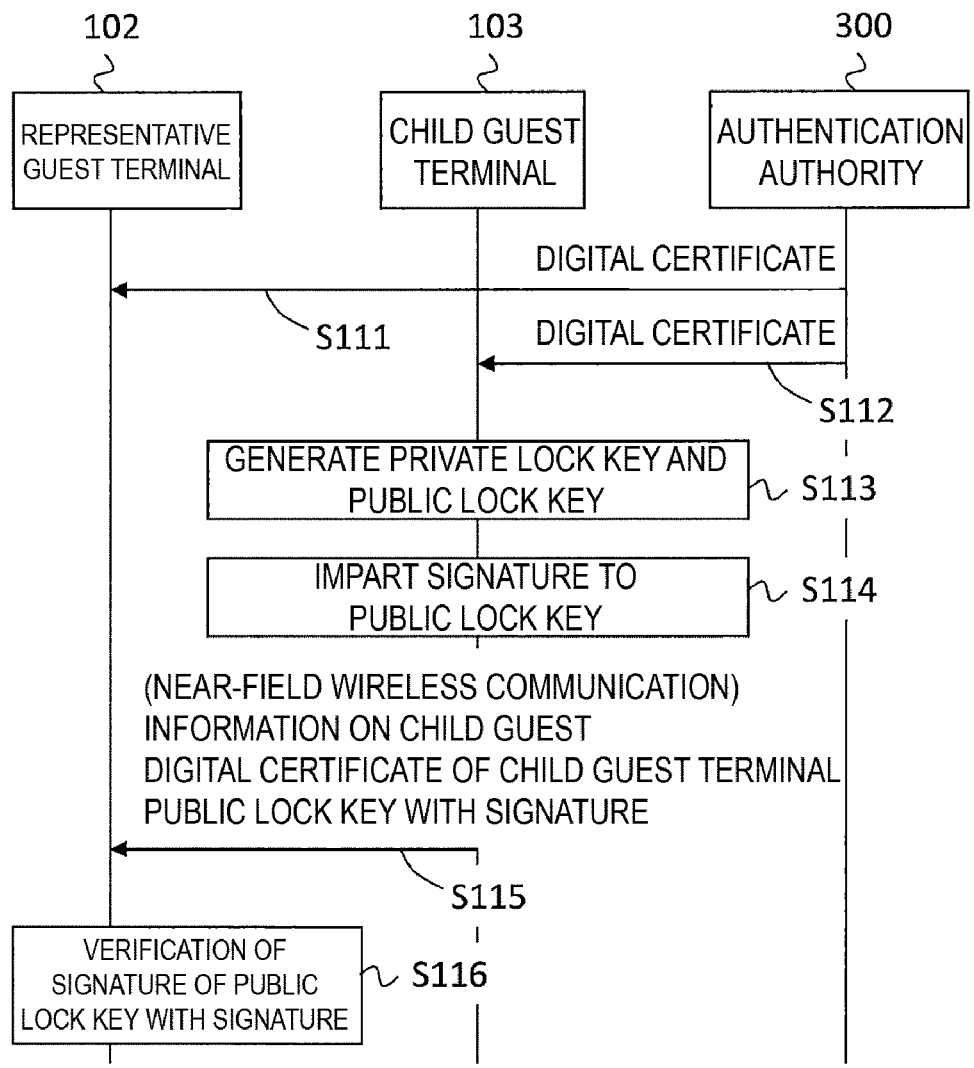
FIG. 6 is a sequence diagram illustrating a process of preparing for registration of a child guest terminal in a management server according to the present embodiment.

FIG. 6 is a sequence diagram illustrating a process of preparing for registration of the child guest terminal 103 in the management server 200 according to the present embodiment. The child guest terminal 103 is registered in the management server 200 via the representative guest terminal 102 and the owner terminal 101. In the process of preparing for registration of the child guest terminal 103 (invitation preparation process for the child guest), the information of the child guest terminal 103 is transmitted to the representative guest terminal 102, and preparation before the information is transmitted to the owner terminal 101 is executed.

In step S111, the representative guest terminal 102 acquires the digital certificate 131 (see FIG. 2) from the authentication authority 300. An acquisition procedure has been described in the description of the private management key 151 and the public management key 152 illustrated in FIG. 2.

In step S112, the child guest terminal 103 acquires the digital certificate 131 from the authentication authority 300.

In step S113, the child guest terminal 103 generates a pair of the private lock key 141 and the public lock key 142.

In step S114, the child guest terminal 103 signs the public lock key 142 with the private management key 151.

Hereinafter, the description will be continued assuming that the child guest meets the representative guest and the child guest terminal 103 and the representative guest terminal 102 can communicate with each other by near-field wireless communication.

In step S115, the child guest terminal 103 transmits the information on the child guest, the digital certificate 131 of the child guest terminal 103, and the public lock key with a signature generated in step S114 to the representative guest terminal 102 by near-field wireless communication and requests registration. The information on the child guest includes a name of the child guest, the identification information of the child guest terminal 103, and the like. The public lock key 142 and the digital certificate 131 are used as authentication information for authenticating the child guest terminal 103 at the time of unlocking the smart lock 400.

In step S116, the representative guest terminal 102 verifies the signature of the received public lock key to which a signature is imparted. Specifically, the representative guest terminal 102 verifies the signature of the received digital certificate 131 of the child guest terminal 103 using the authentication authority public key 132, and acquires the public management key 152 of the child guest terminal 103. Subsequently, the representative guest terminal 102 verifies the signature of the received public lock key with a signature using the acquired public management key 152 of the child guest terminal 103. Thus, the representative guest terminal 102 acquires the genuine public lock key 142 of the child guest terminal 103.

Process of Preparing For Registration of Representative Guest Terminal

Figure 7:
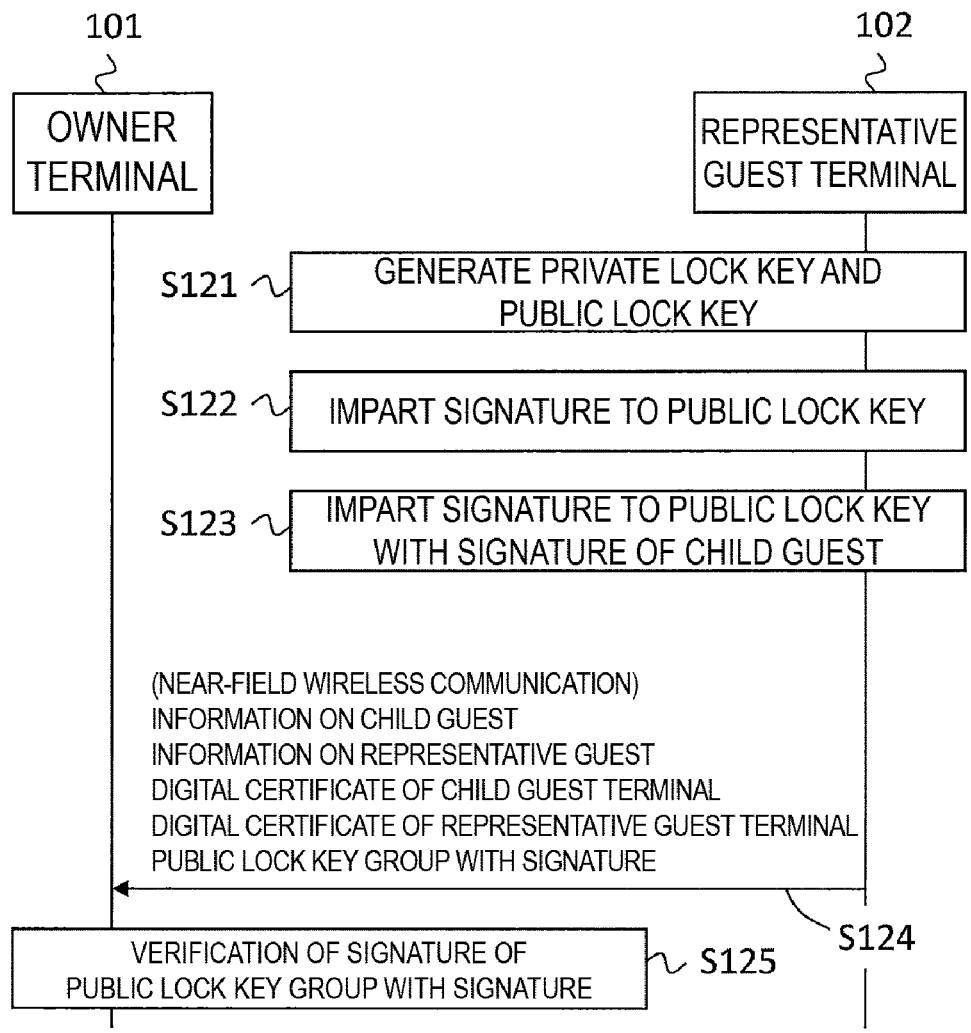
FIG. 7 is a sequence diagram illustrating a process of preparing for registration of a representative guest terminal in the management server according to the present embodiment.

FIG. 7 is a sequence diagram illustrating a process of preparing for registration of the representative guest terminal 102 in the management server 200 according to the present embodiment. The child guest terminal 103 and the representative guest terminal 102 are registered in the management server 200 via the owner terminal 101. In the process of preparing for registration of the representative guest terminal 102 (invitation preparation process for the representative guest), information on the child guest terminal 103 and the representative guest terminal 102 is transmitted to the owner terminal 101.

In step S121, the representative guest terminal 102 generates a pair of the private lock key 141 and the public lock key 142.

In step S122, the representative guest terminal 102 signs the public lock key 142 with the private management key 151.

In step S123, the representative guest terminal 102 signs the public lock key with a signature received from the child guest terminal 103 using the private management key 151. The signature of the child guest terminal 103 and the signature of the representative guest terminal 102 are imparted to the public lock key 142 of the child guest terminal 103 for double signature.

Hereinafter, the public lock key with a signature of the representative guest terminal 102 generated in step S122 and the double-public lock key with a signature generated in step S123 are collectively referred to as a public lock key group with a signature.

Hereinafter, the description will be continued assuming that the representative guest meets the owner and the representative guest terminal 102 and the owner terminal 101 can communicate with each other by near-field wireless communication.

In step S124, the representative guest terminal 102 transmits the information on the child guest, the information on the representative guest, the digital certificate 131 of the child guest terminal 103, the digital certificate 131 of the representative guest terminal 102, and the public lock key group with a signature to the owner terminal 101 by near-field wireless communication to request registration (authorization and registration). The information on the representative guest includes a name of the representative guest, identification information of the representative guest terminal 102, and the like. The digital certificate 131, or the public lock key 142 of the child guest terminal 103 and the representative guest terminal 102 included in the public lock key group with a signature are used as authentication information for authenticating the child guest terminal 103 at the time of unlocking the smart lock 400.

In step S125, the owner terminal 101 verifies the signature of the received public lock key group with a signature. Specifically, the owner terminal 101 verifies the signatures of the received digital certificate 131 of the child guest terminal 103 and the receives digital certificate 131 of the representative guest terminal 102 using the authentication authority public key 132, and acquires the public management key 152 of the child guest terminal 103 and the public management key 152 of the representative guest terminal 102. Subsequently, the owner terminal 101 verifies the signature of the received public lock key group with a signature using the acquired public management key 152 of the child guest terminal 103 and the acquired public management key 152 of the representative guest terminal 102. Thus, the owner terminal 101 acquires the genuine public lock key 142 of the child guest terminal 103 and the representative guest terminal 102.

Process of Registering Guest Terminal

Figure 8:
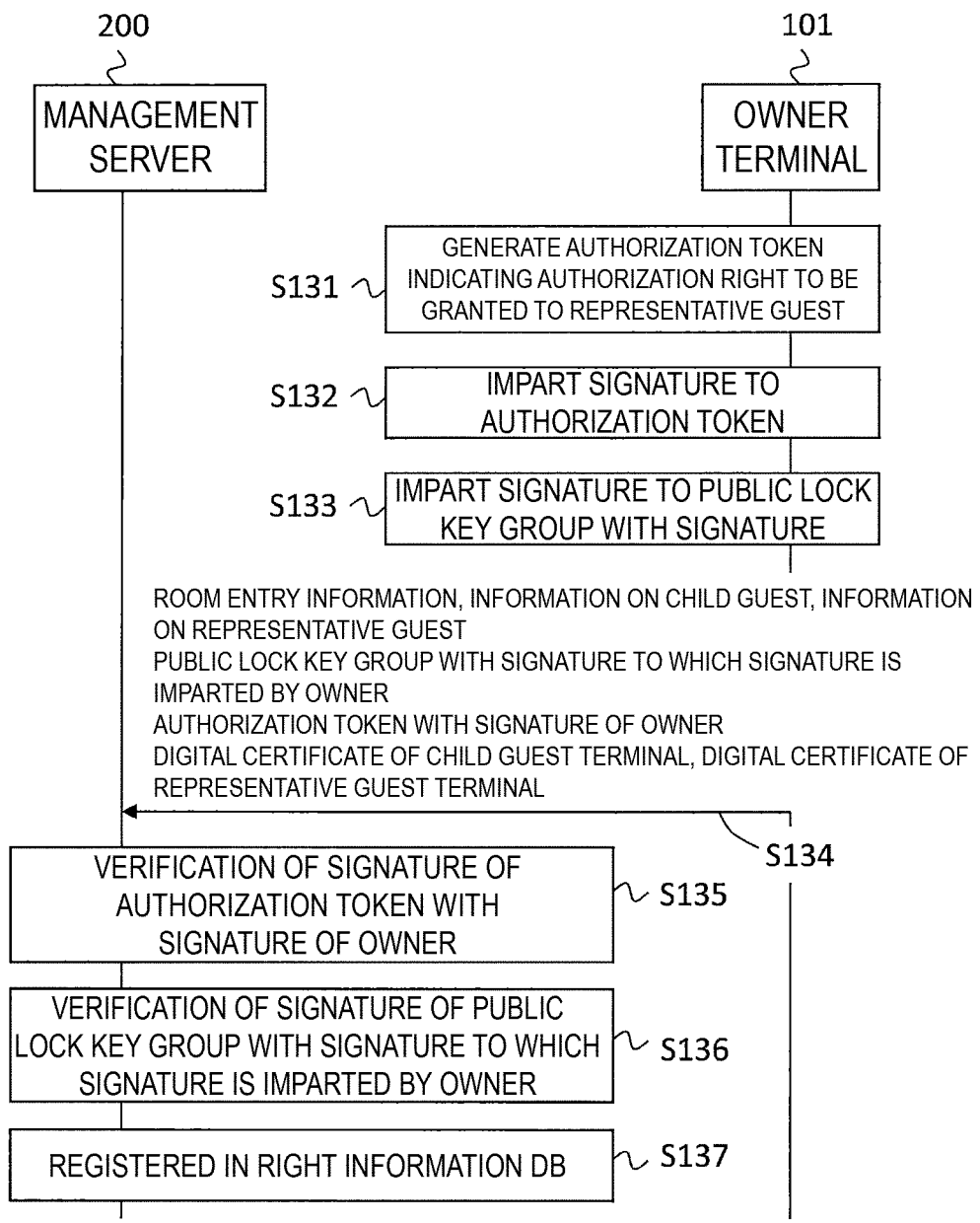
FIG. 8 is a sequence diagram illustrating a process of registering the child guest terminal and the representative guest terminal in the management server according to the present embodiment.

FIG. 8 is a sequence diagram illustrating a process of registering the child guest terminal 103 and the representative guest terminal 102 (also referred to as a guest terminal) in the management server 200 according to the present embodiment. Through the process of preparing for registration of the child guest terminal 103 (see FIG. 6) and the process of preparing for registration of the representative guest terminal 102 (see FIG. 7), the owner terminal 101 acquires the genuine public lock key 142 of the child guest terminal 103 and the representative guest terminal 102. In the process of registering a guest terminal (guest invitation process), the owner terminal 101 transmits the public lock key 142 to the management server 200 together with the information on the child guest or information on parent guest to request registration.

Hereinafter, the description will be continued assuming that the owner terminal 101 displays information on the child guest and the representative guest to ask the owner to confirm the request for registration of the guest terminal, and the owner confirms the request for registration of the guest terminal and instructs the registration.

In step S131, the owner terminal 101 generates an authorization token indicating an authorization right to authorize the representative guest. The authorization token includes the identification information of the owner terminal 101 that gives the authorization right, the identification information of the representative guest terminal 102 that acquires the authorization right, the authorization right, a validity period of the authorization right, and the like. Examples of the authorization right include addition of child guests and deletion of child guests.

In step S132, the owner terminal 101 signs the authorization token using the private management key 151.

In step S133, the owner terminal 101 uses the private management key 151 to sign the public lock key group with a signature received from the representative guest terminal 102. The signature of the child guest terminal 103, the signature of the representative guest terminal 102, and the signature of the owner terminal 101 are imparted to the public lock key 142 of the child guest terminal 103 for triple signature. The signature of the representative guest terminal 102 and the signature of the owner terminal 101 are imparted to the public lock key 142 of the representative guest terminal 102 for double signature.

In step S134, the owner terminal 101 transmits the room entry information, the information on the child guest, the information on the representative guest, a public lock key group with a signature to which the signature is imparted by the owner, an authorization token to which the signature is imparted by the owner, the digital certificate 131 of the child guest terminal 103, and the digital certificate 131 of the representative guest terminal 102 to the management server 200 to request registration. The room entry information includes identification information of the smart lock 400, or information such as a period, a day of the week, and a time zone in which the parent guest or the child guest authorized by the owner can enter the room.

In step S135, the management server 200 verifies the signature of the authorization token to which the signature is imparted by the owner. The public management key 242 (see FIG. 4) is used for verification.

In step S136, the management server 200 verifies the signature of the public lock key group with a signature to which the signature is imparted by the owner. The public lock key group with a signature to which the signature is imparted by the owner includes the signature by the owner terminal 101, the signature by the representative guest terminal 102, and the signature by the child guest terminal 103, and the management server 200 uses the public management key 242, the public management key 152 of the representative guest terminal 102, and the public management key 152 of the child guest terminal 103 to perform verification. The management server 200 verifies the signatures of the received digital certificate 131 of the representative guest terminal 102 and the child guest terminal 103 using the authentication authority public key 232, and acquires the public management key 152 of the representative guest terminal 102 and the child guest terminal 103. By verifying the signature of the digital certificate 131, the management server 200 can acquire the genuine public management key 152 of the representative guest terminal 102 and the child guest terminal 103.

In step S137, the management server 200 stores the acquired information in the right information database 240 (see FIG. 4). Specifically, the information on the representative guest 250 is created in association with the room entry information 243 of the right information database 240 including the smart lock identification information included in the received room entry information, and the information relevant to the representative guest is stored in the information on the representative guest 250. Specifically, the management server 200 stores the received authorization token to which a signature is imparted by the owner in the authorization token 256 and the signature 257 of the owner. Further, the management server 200 stores the received public lock key 142 and the received signature of the representative guest terminal 102 included in the public lock key group with a signature to which the signature is imparted by the owner in the public lock key 251, the signature 252 of the representative guest, and the signature 253 of the owner. The management server 200 stores the received digital certificate 131 of the representative guest terminal 102 in the digital certificate 254. Further, the management server 200 stores information such as a period in which the representative guest can enter the room, which is included in the received information on the representative guest or the received room entry information, in the usage right 255.

The same applies to the information on the child guest 260. Specifically, the management server 200 creates information on the child guest 260 in association with the information on the representative guest 250. Subsequently, the management server 200 stores the public lock key of the child guest terminal 103 and the imparted triple signature in the public lock key 261, the signature 262 of the child guest, the signature 263 of the representative guest, and the owner signature 264, and stores the digital certificate, the information on the child guest, and the room entry information in the digital certificate 265 and the usage right 266.

The public lock keys 251 and 261 or the digital certificates 254 and 265 registered in the information on the representative guest 250 and the information on the child guest 260 are referred to as authentication information when the management server 200 verifies the signature generated by the representative guest terminal 102 or when the representative guest terminal 102 and the child guest terminal 103 are authenticated at the time of unlocking the smart lock 400.

Through the process of preparing for registration of a child guest terminal, the process of preparing for registration of a representative guest terminal, and the process of registering the guest terminal described with reference to FIGS. 6 to 8, the public lock keys 142, 251 and 261, the digital certificates 131, 254, and 265, and the usage rights 255 and 266 of the child guest terminal 103 and the representative guest terminal 102 are registered in the management server 200. The management server 200 authenticates the child guest terminal 103 or the representative guest terminal 102 using these pieces of information and then the smart lock 400 is unlocked.

Process of Unlocking Smart Lock

Figure 9:
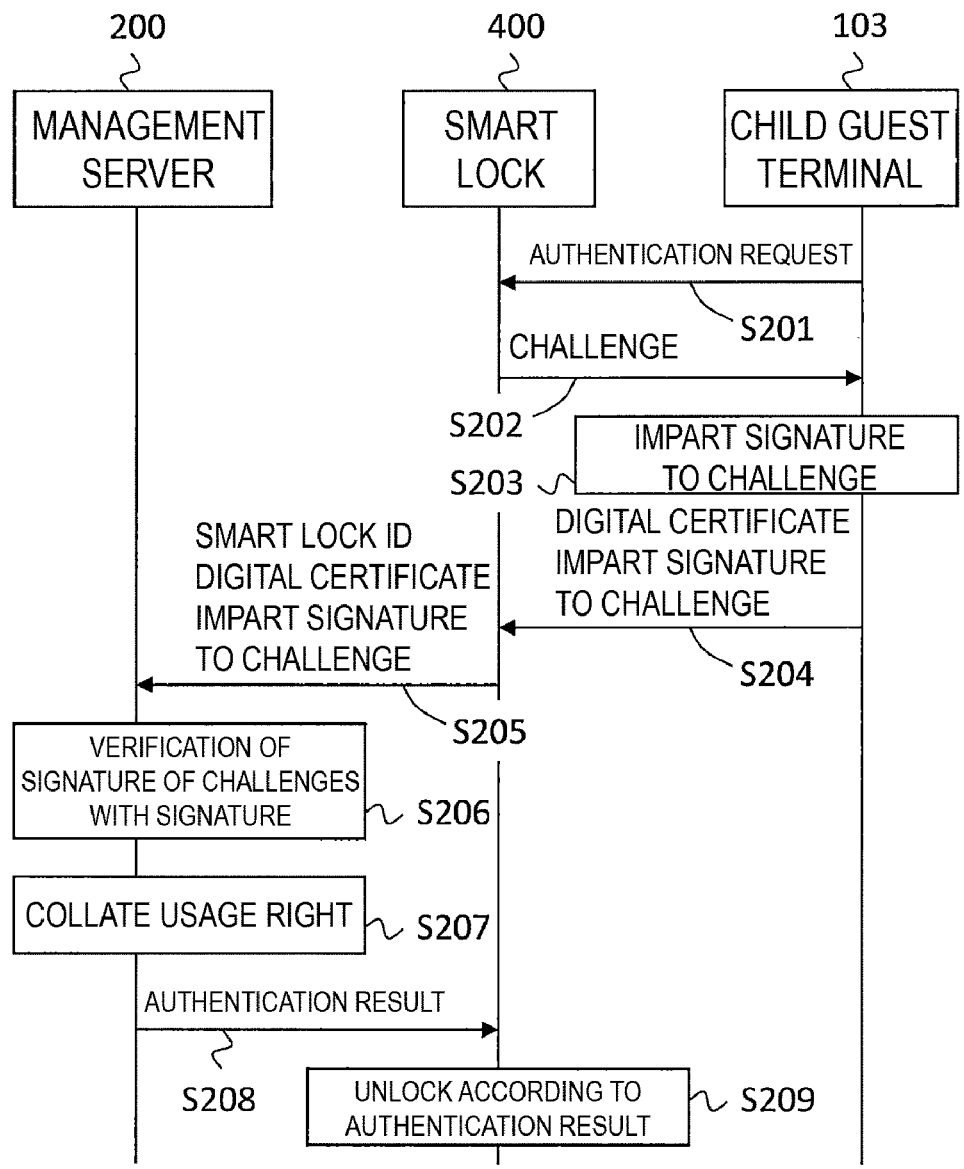
FIG. 9 is a sequence diagram illustrating a process in which the child guest terminal unlocks a smart lock according to the present embodiment.

FIG. 9 is a sequence diagram illustrating a process of unlocking the smart lock 400 by the child guest terminal 103 according to the present embodiment. A process after the child guest approaches a door on which the smart lock 400 is installed and instructs the child guest terminal 103 to unlock the smart lock 400 will be described.

In step S201, the child guest terminal 103 transmits an authentication request to the smart lock 400.

In step S202, the smart lock 400 generates a random number and transmits the random number to the child guest terminal 103 as a challenge.

In step S203, the child guest terminal 103 signs the received challenge with the private lock key 141.

In step S204, the child guest terminal 103 transmits the challenge with a signature and the digital certificate 131 to the smart lock 400.

In step S205, the smart lock 400 transmits smart lock identification information of the smart lock 400, the received digital certificate, and the received challenge with a signature to the management server 200.

In step S206, the management server 200 verifies the signature of the challenge with a signature.

Specifically, the management server 200 searches for the room entry information 243 in the right information database 240, which includes the smart lock identification information.

Subsequently, the management server 200 searches the information on the representative guest 250 and the information on the child guest 260 associated with the room entry information of the search result for the digital certificate 254 and 265 matching the received digital certificate.

Then, the management server 200 verifies the signature of the challenge with a signature using the public lock keys 251 and 261 included in the information on the representative guest 250 or the information on the child guest 260 of the search result. When the management server 200 fails in any of the search for the room entry information 243, the search for the digital certificates 254 and 265, and the verification of the signature, the management server 200 determines that the authentication has failed.

In step S207, the management server 200 collates the usage right. Specifically, the management server 200 collates the usage right with the usage right 255 or 266 included in the information on the representative guest 250 or the information on the child guest 260 searched for in step S206. The usage rights 255 and 266 include conditions such as a period or time zone in which room entry is authorized and, when the conditions are not satisfied, the management server 200 determines that the authentication has failed.

In step S208, the management server 200 transmits an authentication result to the smart lock 400.

Specifically, when the authentication fails in any of steps S206 and S207, authentication failure is transmitted and, otherwise, authentication success is transmitted.

In step S209, the smart lock 400 is unlocked according to the received authentication result. Specifically, the smart lock 400 is unlocked when the authentication is successful, and is not unlocked when the authentication fails.

Process of Additionally Registering Child Guest

In the processes of FIGS. 6 to 8, the representative guest and the owner meet each other, and the representative guest and the child guest are registered (invited). After the representative guest is registered, the representative guest is able to register the child guest without facing the owner.

Figure 10:
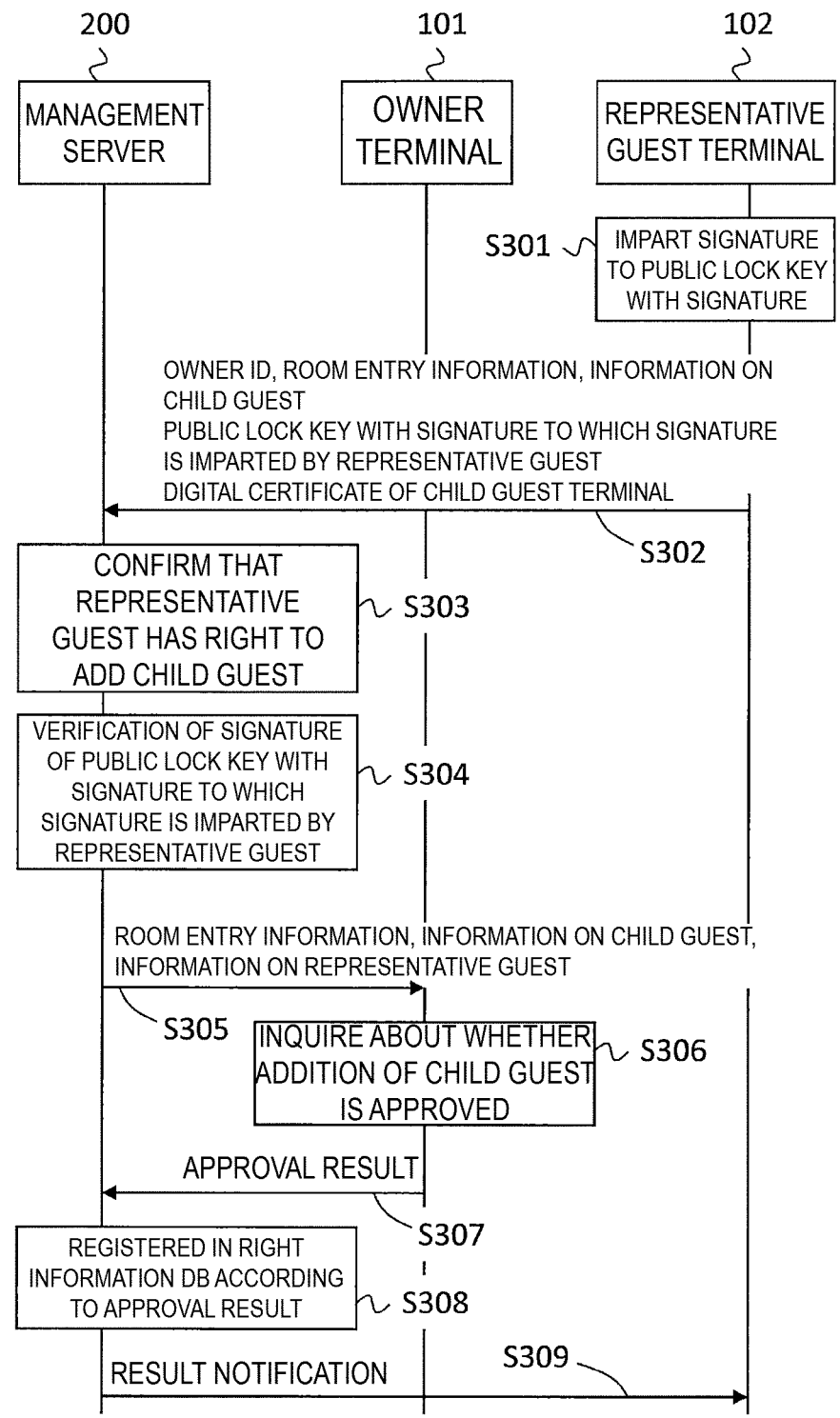
FIG. 10 is a sequence diagram illustrating a process of additionally registering a child guest according to the present embodiment.

FIG. 10 is a sequence diagram illustrating a process of additionally registering a child guest according to the present embodiment. Hereinafter, subsequent processes will be described assuming that the process of preparing for registration of the child guest terminal 103 to be added (see FIG. 6) ends.

In step S301, the representative guest terminal 102 signs the public lock key with a signature received from the child guest terminal 103 using the private management key 151.

In step S302, the representative guest terminal 102 transmits the owner identification information, the room entry information, the information on the child guest, the public lock key with a signature to which the signature is imparted by the representative guest, and the digital certificate 131 of the child guest terminal 103 to the management server 200 to request the registration.

In step S303, the management server 200 confirms that the representative guest has a right to add a child guest. Specifically, the management server 200 refers to the authorization token 256 included in the information on the representative guest 250 of the right information database 240 (see FIG. 4) to perform the confirmation.

In step S304, the management server 200 verifies the signature included in the received public lock key with a signature to which the signature is imparted by representative guest. The digital certificate 254 included in the information on the representative guest 250 corresponding to the representative guest terminal 102 is used for the verification of the signature of the representative guest terminal 102. Further, the received digital certificate of the child guest terminal 103 is used for the verification of the signature of the child guest terminal 103.

In step S305, the management server 200 transmits the room entry information, the information on the child guest, and the information on the representative guest to the owner terminal 101. The information on the representative guest is acquired from the right information database 240.

In step S306, the owner terminal 101 displays the received room entry information, information on the child guest, and the information on the representative guest, inquires of the owner about approval or disapproval of the additional registration of the child guest, and acquires an approval result.

In step S307, the owner terminal 101 transmits the acquired approval result (approval or disapproval) to the management server 200.

In step S308, the management server 200 registers the child guest terminal 103 in the right information database 240 when the received approval result can be approved. A registering process is the same as in step S137 (see FIG. 8). The information on the representative guest terminal 102 has already been registered, and the registration is not required. When the approval is rejected, the management server 200 does not register the child guest terminal 103.

In step S309, the management server 200 transmits the approval result to the representative guest terminal 102.

Characteristics of Authorization System

In the above-described embodiment, the child guest is registered (invited) via the representative guest. For details, the child guest that the representative guest confirms while facing child guest is confirmed and registered by the owner facing the representative guest. Thus, the owner does not have to confirm and register the individual child guests while facing the child guests individually, which reduces a burden of the registration.

When the representative guest is registered, not only the representative guest can enter the room, but also the right to add a child guest is granted to the representative guest (see the authorization token 256 illustrated in FIG. 4 and step S131 illustrated in FIG. 8). After the right is granted, the representative guest can apply for addition of a child guest (make a request for authorization and registration) without facing the owner (see step S302 in FIG. 10) and the owner approves the application (see step S306). Thus, a burden on the representative guest and the owner is reduced.

In the process of preparing for registration of the child guest terminal 103 (see FIG. 6), the representative guest meets the child guest, which facilitates confirmation of the child guest and prevents impersonation. Further, in the process of preparing for registration of the representative guest terminal 102 (see FIG. 7), the owner meets the representative guest, which facilitates the confirmation of the representative guest and prevents impersonation.

In the unlocking of the smart lock 400 in the authorization system 10, the guest terminal is authenticated by adopting a digital signature technology based on public key encryption instead of passing a duplicate key (invitation URL) to the guest terminal. Thus, the duplicate key does not pass to an unintended third party, only guests invited or approved by the owner are allowed to enter the room, and the third party can be prevented from entering the room.

Modification Example 1: Plurality of Child Guest Terminals

In the above-described embodiment, one child guest terminal 103 is registered (invited) in the management server 200. A plurality of child guest terminals 103 may be registered together.

Specifically, the representative guest terminal 102 receives public lock keys with a signature from the plurality of child guest terminals 103, and collectively transmits the plurality of public lock keys with a signature to the owner terminal 101 in step S123 (see FIG. 7). The owner terminal 101 collectively transmits a plurality of public lock keys with a signature to the management server 200 and registers the public lock keys with a signature.

By doing so, a burden on the owner on facing the individual child guests is reduced.

The same applies to the additional registration of the child guest terminal 103, and in step S302 (see FIG. 10), the representative guest terminal 102 may collectively transmit a plurality of public lock keys with a signature to the management server 200.

Modification Example 2: Room Entry Information at Time of Additional Registration The representative guest determines the room entry information (such as a period in which a child guest can enter a room; see step S302 in FIG. 10) at the time of adding a child guest.
Alternatively, the owner may determine the room entry information when the owner approves or the owner may correct and approve room entry information transmitted by the representative guest. The room entry information in this case is transmitted from the owner terminal 101 to the management server 200 in step S307 and is registered in the right information database 240 in step S308.

Figure 11:
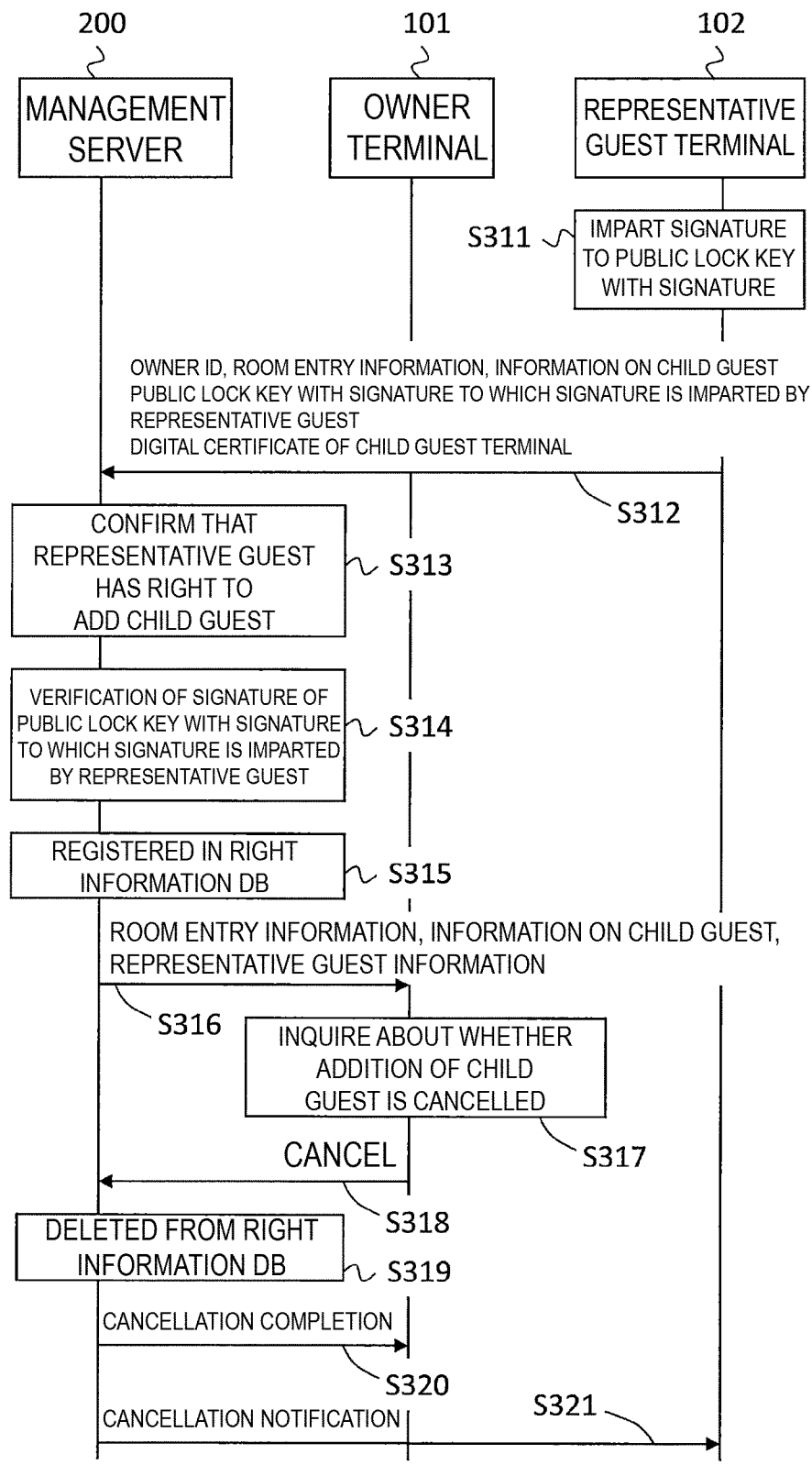
FIG. 11 is a sequence diagram illustrating a process of additionally registering a child guest according to modification example 3 of the present embodiment.

Modification Example 3: Additional Registration of Child Guest Without Owner Approval In the above-described embodiment, the child guest is additionally registered after approval of the owner. The additional registration may be performed without the approval of the owner and then the owner may cancel the additional registration.
FIG. 11 is a sequence diagram illustrating a process of additionally registering a child guest according to modification example 3 of the present embodiment. FIG. 11 is a process that is an alternative to FIG. 10.

Steps S311 to S314 are the same processes as steps S301 to S304.
In step S315, the management server 200 registers the child guest terminal 103 in the right information database 240. A registering process is the same as in step S137 (see FIG. 8).
In step S316, the management server 200 transmits the room entry information, the information on the child guest, and the information on the representative guest to the owner terminal 101. The information on the representative guest is acquired from the right information database 240.
In step S317, the owner terminal 101 displays the received room entry information, information on the child guest, and information on the representative guest, and inquires of the owner about cancellation or non-cancellation of the additional registration of the child guest. When the owner does not need to cancel the additional registration, the owner terminal 101 transmits the fact (no cancellation) to the management server 200. When cancellation is not required, the process in the management server 200 is not required, and the process of additionally registering a child guest ends. Hereinafter, the description will be continued assuming that the owner instructs to cancel the additional registration.

In step S318, the owner terminal 101 instructs the management server 200 to cancel the additional registration of the child guest (transmits cancellation).
In step S319, the management server 200 deletes the information on the child guest 260 registered in step S315.
In step S320, the management server 200 notifies the owner terminal 101 that the cancellation has been completed.
In step S321, the management server 200 notifies the representative guest terminal 102 that the additional registration of a child guest has been cancelled.

Characteristics of Modification Example 3
In modification example 3, it is possible for the representative guest to additionally register the child guest without waiting for the approval of the owner, and it is possible to additionally register the child guest more rapidly as compared with the above-described embodiment. Further, the owner can cancel the additional registration.

Modification Example 4: Deletion of Registration of Child Guest

The additional registration of the child guest without facing the owner by the representative guest has been described with reference to FIG. 10 or 11. Similarly, it is possible for the representative guest to delete the registered child guest without facing the owner. Specifically, the representative guest terminal 102 applies to the management server 200 for deletion of the registration of the child guest. Next, the management server 200 determines whether the representative guest has a right to delete a child guest by referring to the authorization token 256, and deletes the information on the child guest 260 when the representative guest has the right. The management server 200 may confirm with the owner before the deletion.

Figure 12:
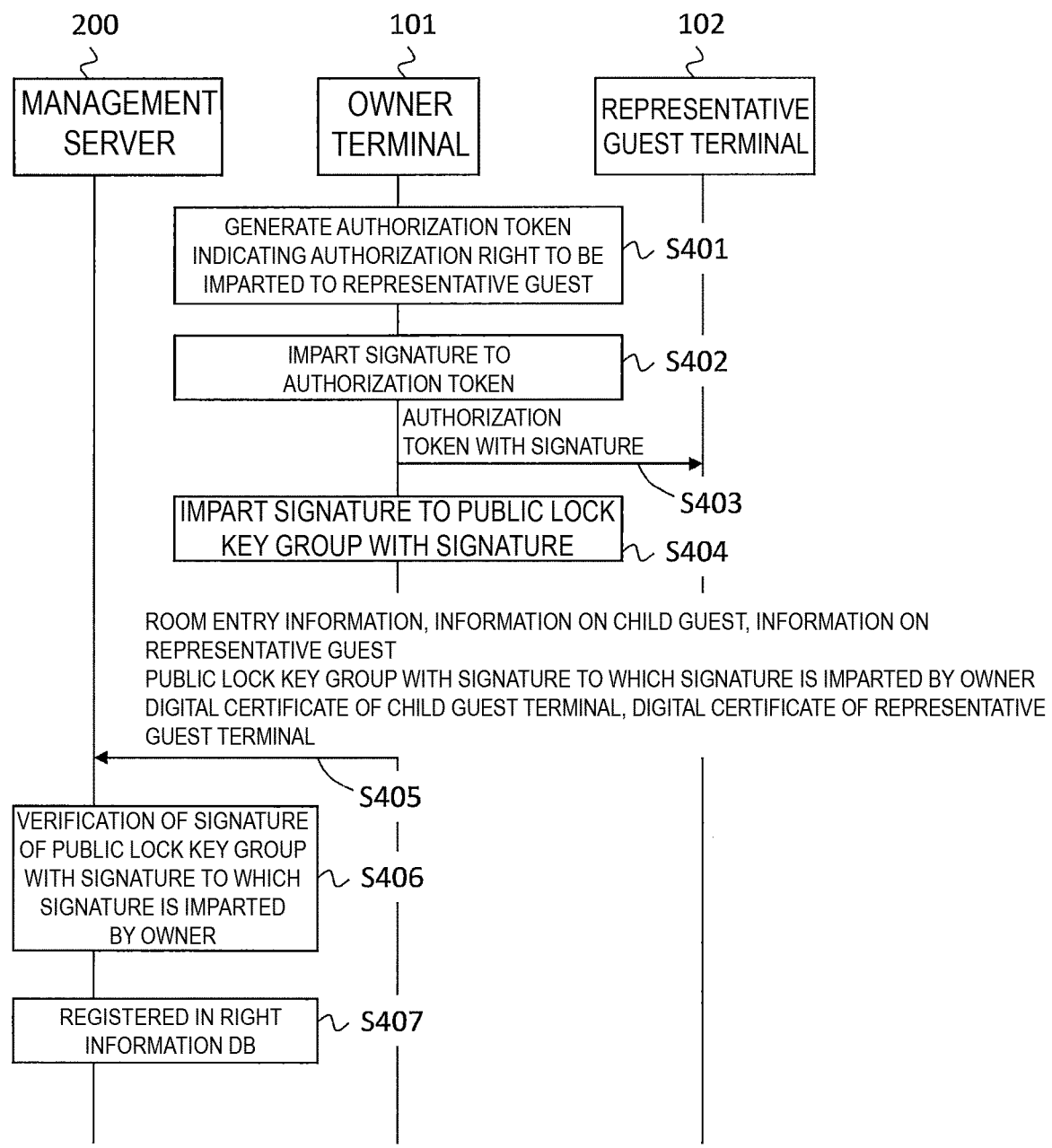
FIG. 12 is a sequence diagram illustrating a process of registering a child guest terminal in a management server according to modification example 5 of the present embodiment.
Figure 13:
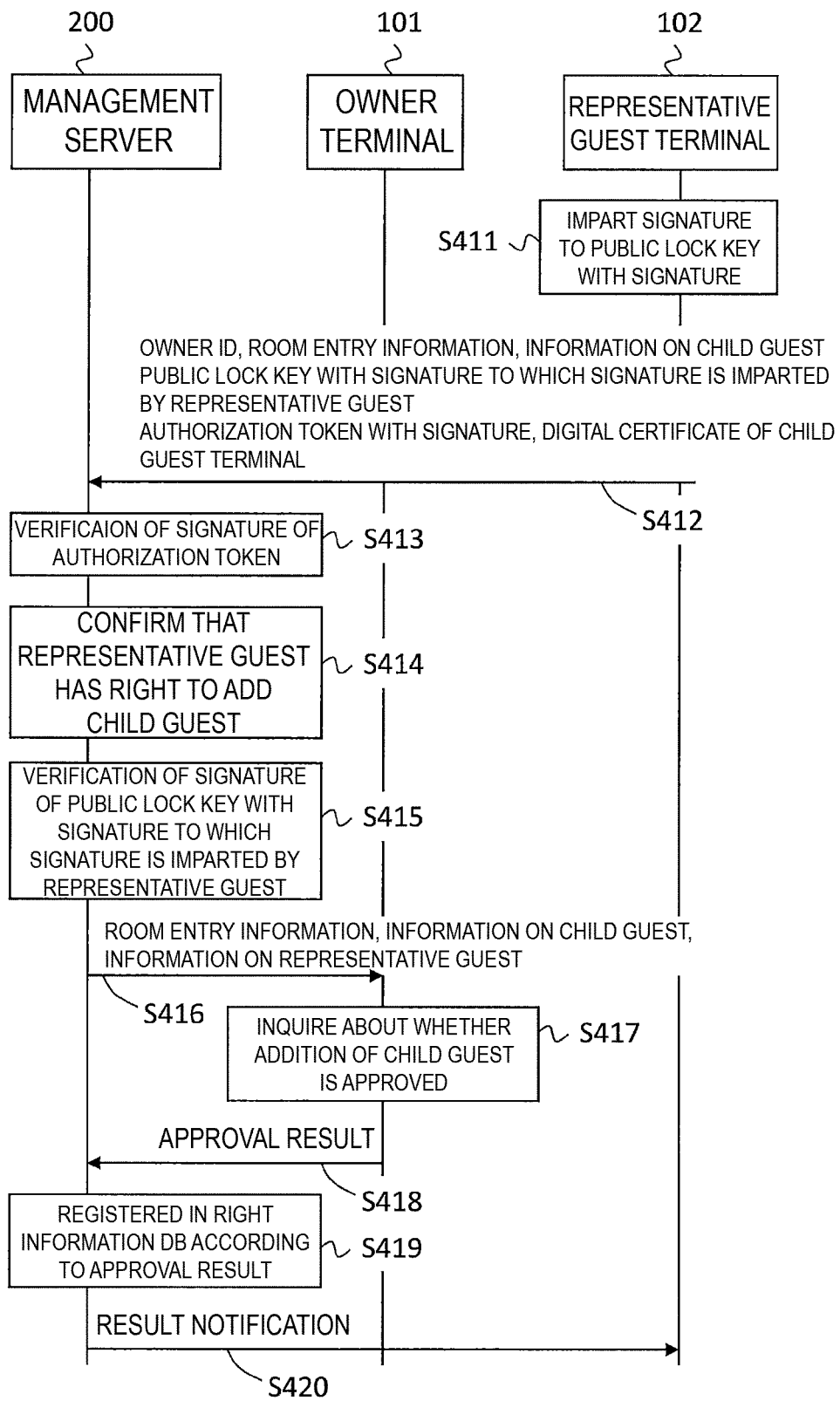
FIG. 13 is a sequence diagram illustrating a process of additionally registering a child guest terminal according to modification example 5 of the present embodiment.

Modification Example 5: Authorization Token Via Representative Guest Terminal In the above-described embodiment, the owner terminal 101 that generates the authorization token transmits the authorization token to the management server 200. Instead of this, the authorization token may be transmitted to the management server 200 via the representative guest terminal 102.
FIG. 12 is a sequence diagram illustrating a process of registering the child guest terminal 103 in the management server 200 according to modification example 5 of the present embodiment. FIG. 12 illustrates a process of preparing for registration of the child guest terminal 103, which is an alternative to FIG. 8.
Steps S401 to S402 are the same processes as steps S131 to S132 illustrated in FIG. 8.
In step S403, the owner terminal 101 transmits the authorization token to which a signature is imparted to the representative guest terminal 102.
Steps S404, S405, S406, and S407 are the same processes as steps S133, S134, S136, and S137, respectively. However, in step S405, the owner terminal 101 does not transmit the authorization token to which a signature is imparted. Further, in step S407, the management server 200 does not register the authorization token in the right information database 240.
FIG. 13 is a sequence diagram illustrating a process of additionally registering a child guest terminal 103 according to modification example 5 of the present embodiment. FIG. 13 is a process of additionally registering the child guest terminal 103 that is an alternative to FIG. 10.
Steps S411 to S412 are the same processes as S301 to S302 described in FIG. 10. However, in step S412, the representative guest terminal 102 also transmits the authorization token to which a signature is imparted, which is received from the owner terminal 101 in step S403, to the management server 200.
Step S413 is the same process as step S135 described in FIG. 8. The authorization token is registered in the right information database 240.

Steps S414 to S420 are the same processes as S303 to S309 illustrated in FIG. 10.

Modification Example 6: Authentication at Time of Transmission to Management Server When the owner terminal 101 or the representative guest terminal 102 requests the management server 200 to register (invite) a child guest, as in step S134 (see FIG. 8) or step S302 (see FIG. 10), a user of the owner terminal 101 or the representative guest terminal 102 may be authenticated using a biometric authentication technology. By doing so, it is possible to improve the reliability of the child guest registration that indicates authorization of the entry to the room.

Modification Example 7: Near-Field Wireless Communication

When the owner and the representative guest terminal meets each other and the owner terminal 101 and the representative guest terminal 102 communicate with each other, near-field wireless communication is used. The owner terminal 101 and the representative guest terminal 102 may be directly connected by a cable for communication.

Modification Example 8: Omission of Signature Verification

In step S136 (see FIG. 8) of the above-described embodiment, the management server 200 verifies the signature by the owner terminal 101, the signature by the representative guest terminal 102, and the signature by the child guest terminal 103 imparted to the public lock key group with a signature to which the signature is imparted by the owner. On the other hand, the signature of the representative guest terminal 102 and the signature of the child guest terminal 103 may be verified by the owner terminal 101 so that only the signature of the owner terminal 101 is verified. By doing so, it is possible for the management server 200 to reduce a processing cost of the registration request.

Modification Example 9: Owner Approval at Time of Additionally Registering Child Guest Terminal In a process of additionally registering a child guest illustrated terminal in FIG. 10, the child guest terminal is registered after the approval of the owner is obtained. On the other hand, in a process of additionally registering a child guest terminal illustrated in FIG. 11, the child guest terminal can be registered before the approval of the owner is obtained, and the owner can cancel the registration later. Additional registration of the child guest terminal of the authentication token may be distinguished into additional registration requiring pre-approval and additional registration requiring no pre-approval. By doing so, an additional registration right that does not require pre-approval is granted to a representative guest who is highly trusted by the owner, an additional registration right that requires pre-approval can be granted to a representative guest who is not highly trusted by the owner.

Modification Example 10: Registration of Representative Guest Terminal>>

In the above-described embodiment, the representative guest terminal 102 is registered (invited) together with the child guest terminal 103. On the other hand, the representative guest terminal 102 may not transmit the authentication information of the child guest terminal 103 to the owner terminal 101, but may transmit only the authentication information and the signature of the representative guest terminal 102 to the owner terminal 101 so that the representative guest terminal 102 alone is registered. Thus, the representative guest terminal 102 can be registered instead of the child guest terminal 103 being registered.

Modification Example 11: Limitation of Registration of Child Guest Terminals In the above-described embodiment, the management server 200 has confirmed that the representative guest terminal 102 has the right to add the child guest terminal 103 by referring to the authorization token. The management server 200 may limit a period in which registration by the representative guest terminal 102 is allowed or the number of child guest terminals 103, including a period in which registration of the authorization token is allowed or the maximum number of child guest terminals 103.

Further, the authorization token may include a date and time when the child guest terminal 103 is allowed to unlock so that a date and time when the child guest terminal 103 registered by the representative guest terminal 102 is allowed to unlock can be limited. The date and time when the child guest terminal 103 is allowed to unlock are stored in the usage right 266 of the information on the child guest 260 (see FIG. 4).

Modification Example 12: Communication Between Terminals

In the above-described embodiment, the child guest terminal 103 transmits authentication information of the child guest terminal 103 to the representative guest terminal 102 using near-field wireless communication. In addition, another secure communication path may be used as long as identity can be sufficiently confirmed. The same applies when the representative guest terminal 102 transmits authentication information of the representative guest terminal 102 to the owner terminal 101.

Modification Example 13: Data Structure of Right Information Database

In the right information database 240 in the above-described embodiment, the owner identification information 241 and the public management key 242, the public management key 242 and the room entry information 243, and the room entry information 243 and the information on the representative guest 250 are associated with each other. Alternatively, the owner identification information 241, the public management key 242, and the room entry information 243 may be collectively regarded as the owner terminal 101 and associated with the information on the representative guest 250 for other data structure.

Other Modification Examples

Although the embodiments of the present invention and some modification examples have been described above, the embodiments and modification examples are merely examples and do not limit the technical scope of the present invention. The present invention can take various other embodiments, and various changes such as omission and substitution can be made without departing from the gist of the present invention. The embodiments or modifications thereof are included in the scope or gist of the invention described in the present specification or the like, and are also included in the scope of the inventions defined in the claims and the equivalent scope thereof.

REFERENCE SIGNS LIST

10 Authorization system
100 Terminal
101 Owner terminal
102 Representative guest terminal
103 Child guest terminal
142, 261 Public lock key
200 Management server
256 Authorization token
300 Authentication authority
400 Smart lock

The invention claimed is:

1. An authorization system comprising a smart lock, an owner terminal used by a manager of the smart lock, a child guest terminal used by a child guest to request unlocking of the smart lock, a representative guest terminal used by a representative guest to request unlocking of the smart lock, and a management server,
wherein the representative guest terminal, including one or more processors, is configured to generate authentication information referred to when the unlocking of the smart lock is requested, impart a first signature to the authentication information, and transmit the authentication information and the first signature to the owner terminal as a request for authorization and registration of the unlocking from the representative guest terminal,
the owner terminal, including one or more processors, is configured to:
upon successfully verifying the first signature included in information received from the representative guest terminal and receiving information for approving the authorization and registration of the unlocking for the representative guest terminal by the manager, impart a second signature to the authentication information of the representative guest terminal, and
transmit the information included in the received request for the authorization and registration of the unlocking and the second signature of the owner terminal for the authentication information of the representative guest terminal to the management server,
the management server, including one or more processors, is configured to:
upon successfully verifying the first and second signatures included in information received from the owner terminal, store the owner terminal and the representative guest terminal in association with each other and store the authentication information of the representative guest terminal and the representative guest terminal in association with each other,
refer to the authentication information associated with the representative guest terminal to determine whether or not the unlocking request is an unlocking request transmitted by the representative guest terminal when the unlocking request transmitted by the representative guest terminal requesting the unlocking is received from the smart lock, and transmit a result of the determination to the smart lock, and
the smart lock is configured to be unlocked when the management server determines that the unlocking request is the unlocking request transmitted by the representative guest terminal.

2. The authorization system according to claim 1,
wherein the child guest terminal is configured to generate authentication information referred to when the unlocking of the smart lock is requested, impart a third signature to the authentication information, and transmit the authentication information and the third signature to the representative guest terminal,
the representative guest terminal is configured to
upon successfully verifying the third signature included in information received from the child guest terminal, impart the first signature to the authentication information of the child guest terminal, and
transmit the authentication information of the child guest terminal, the third signature of the child guest terminal for the authentication information, and the first signature of the representative guest terminal for the authentication information, in addition to the request for the authorization and registration of the unlocking from the representative guest terminal, to the owner terminal as a request for authorization and registration of the unlocking by the child guest terminal,
the owner terminal is configured to
upon successfully verifying the first and third signatures included in the request for the authorization and registration of the unlocking by the child guest terminal received from the representative guest terminal and receiving information for approving the authorization and registration of the unlocking by the child guest terminal by the manager, impart the second signature to the authentication information of the child guest terminal, and
transmit information included in the request for the authorization and registration of the unlocking by the child guest terminal received from the representative guest terminal and the second signature of the owner terminal for the authentication information of the child guest terminal to the management server together with information included in the request for the authorization and registration of the unlocking from the representative guest terminal and the second signature of the owner terminal for the authentication information of the representative guest terminal,
the management server is configured to
upon successfully verifying the first, second, and third signatures included in information received from the owner terminal, store the representative guest terminal and the child guest terminal in association with each other, store the authentication information of the child guest terminal and the child guest terminal in association with each other,
refer to the authentication information associated with the child guest terminal to determine whether or not the unlocking request is an unlocking request transmitted by the child guest terminal when the unlocking request transmitted by the child guest terminal requesting unlocking is received from the smart lock, and transmits a result of the determination to the smart lock, and
the smart lock is configured to be unlocked when the management server determines that the unlocking request is the unlocking request transmitted by the child guest terminal.

3. The authorization system according to claim 1,
wherein the owner terminal is configured to
generate an authorization token indicating that the request for the authorization and registration of the unlocking to the management server is authorized to the representative guest terminal and impart the second signature to the authorization token, and transmit the authorization token with the second signature to the management server, the management server is configured to verify the second signature imparted to the authorization token received from the owner terminal, and store the authorization token and the representative guest terminal in association with each other, the child guest terminal is configured to generate authentication information referred to when the unlocking of the smart lock is requested, impart the third signature to the authentication information, and transmit the authentication information and the third signature to the representative guest terminal, the representative guest terminal is configured to upon successfully verifying the third signature included in information received from the child guest terminal, impart the first signature to the authentication information of the child guest terminal, and transmit the authentication information of the child guest terminal, the third signature of the child guest terminal for the authentication information, and the first signature of the representative guest terminal for the authentication information to the management server as a request for authorization and registration of unlocking by the child guest terminal, and the management server is configured to upon successfully verifying the first and third signatures included in information received from the representative guest terminal, and confirming that the authorization token associated with the representative guest terminal is stored, store the representative guest terminal and the child guest terminal included in the request for the authorization and registration of the unlocking in association with each other, and store the authentication information of the child guest terminal and the child guest terminal in association with each other.

4. The authorization system according to claim 1, wherein the owner terminal is configured to generate an authorization token indicating that the request for the authorization and registration of the unlocking to the management server is authorized to the representative guest terminal and impart the second signature to the authorization token, and transmit the authorization token with the second signature to the representative guest terminal, the representative guest terminal is configured to verify the second signature imparted to the authorization token received from the owner terminal, and store the authorization token, the child guest terminal is configured to generate authentication information referred to when the unlocking of the smart lock is requested, impart a third signature to the authentication information, and transmit the authentication information and the third signature to the representative guest terminal, the representative guest terminal is configured to upon successfully verifying the third signature included in information received from the child guest terminal, impart the first signature to the authentication information of the child guest terminal, and transmit the authentication information of the child guest terminal, the third signature of the child guest terminal for the authentication information, the first signature of the representative guest terminal for the authentication information, and the authorization token to which the second signature is imparted to the management server as a request for authorization and registration of unlocking by the child guest terminal, and the management server is configured to upon successfully verifying the first, second, third signatures included in information received from the representative guest terminal, and successfully verifying that the representative guest terminal authorized by the authorization token is a representative guest terminal requesting the authorization and registration of the unlocking, store the representative guest terminal and the child guest terminal included in the request for the authorization and registration of the unlocking in association with each other, and store the authentication information of the child guest terminal and the child guest terminal in association with each other.

5. The authorization system according to claim 3, wherein the authorization token includes cancellation of the authorization and registration of the unlocking by the child guest terminal, the representative guest terminal is configured to request the cancellation of the authorization and registration from the child guest terminal, and the management server is configured to upon successfully verifying that the authorization token corresponding to the representative guest terminal is stored, or successfully verifying the second signature imparted to the authorization token corresponding to the representative guest terminal, the authorization token being included in the request for cancellation of the authorization and registration, delete the authentication information of the child guest terminal associated with the representative guest.

6. The authorization system according to claim 3, wherein the authorization token includes either of the maximum number of child guest terminals for which authorization and registration of unlocking are allowed and a period in which registration is allowed, the management server is configured to receive the request for the authorization and registration of the unlocking up to the maximum number from the representative guest terminal when the authorization token includes the maximum number, receive the request for the authorization and registration of the unlocking when the authorization token includes the period in which registration is allowed and there is the request from the representative guest terminal in the period in which registration is allowed.

7. The authorization system according to claim 3, wherein the authorization token includes a date and time at which the unlocking is authorized, and the management server is configured to store the authentication information of the child guest terminal requesting authorization and registration of the unlocking and the child guest terminal in association with the date and time at which the unlocking is authorized when storing the authentication information of the child guest terminal requesting authorization and registration of the unlocking and the child guest terminal in association with each other, and determine whether or not a transmission time of the unlocking request is included in the date and time at which unlocking is authorized, the date and time being stored in association with the child guest terminal, when determining whether or not the unlocking request is an unlocking request that the child guest terminal transmits.

8. The authorization system according to claim 3,
wherein, when the management server receives, from the representative guest terminal, a request for authorization and registration of unlocking by the child guest terminal, the management server is configured to inquire of the owner terminal about approval or disapproval of the authorization and registration of the unlocking before storing the authentication information of the child guest terminal and the child guest terminal in association with each other,
the owner terminal is configured to receive information indicating approval or disapproval of the authorization and registration of the unlocking from the manager, and transmit the approval or disapproval to the management server, and
when the management server receives the approval, the management server stores is configured to store the authentication information and the child guest terminal in association with each other.

9. The authorization system according to claim 3,
wherein, when the management server receives, from the representative guest terminal, a request for authorization and registration of unlocking by the child guest terminal, the management server is configured to store the representative guest terminal and the child guest terminal in association with each other, store the authentication information of the child guest terminal and the child guest terminal in association with each other, and then notify the owner terminal of the authorization and registration of the unlocking,
the owner terminal is configured to receive information indicating cancellation or non-cancellation of the authorization and registration of the unlocking from the manager, and transmit cancellation or non-cancellation to the management server, and
when the management server receives the cancellation, the management server is configured to delete the authentication information stored in association with the child guest terminal.

10. A management server of an authorization system comprising a smart lock, an owner terminal used by a manager of the smart lock, a child guest terminal used by a child guest to request unlocking of the smart lock, a representative guest terminal used by a representative guest to request unlocking of the smart lock, and a management server,
wherein the management server is configured to receive authentication information referred to when the representative guest terminal requests unlocking of the smart lock, a first signature of the representative guest terminal and a second signature of the owner terminal for the authentication information from the owner terminal,
upon successfully verifying the first and second signatures included in information received from the owner terminal, store the owner terminal and the representative guest terminal in association with each other and store the authentication information of the representative guest terminal and the representative guest terminal in association with each other,
refer to the authentication information associated with the representative guest terminal to determine whether or not a unlocking request is an unlocking request transmitted by the representative guest terminal when the unlocking request transmitted by the representative guest terminal requesting the unlocking is received from the smart lock, and transmit a result of the determination to the smart lock.

11. An authorization method in an authorization system comprising a smart lock, an owner terminal used by a manager of the smart lock, a child guest terminal used by a child guest to request unlocking of the smart lock, a representative guest terminal used by a representative guest to request unlocking of the smart lock, and a management server, the method including:
at the representative guest terminal, generating authentication information referred to when the unlocking of the smart lock is requested, imparting a first signature to the authentication information, and transmitting the authentication information and the first signature to the owner terminal as a request for authorization and registration of the unlocking from the representative guest terminal,
at the owner terminal,
upon successfully verifying the first signature included in information received from the representative guest terminal and receiving information for approving the authorization and registration of the unlocking for the representative guest terminal by the manager, imparting a second signature to the authentication information of the representative guest terminal, and
transmitting information included in the request for the authorization and registration of the unlocking received from the representative guest terminal and the second signature of the owner terminal for the authentication information of the representative guest terminal to the management server,
at the management server,
upon successfully verifying the first and second signature included in information received from the owner terminal, storing the owner terminal and the representative guest terminal in association with each other, and storing the authentication information of the representative guest terminal and the representative guest terminal in association with each other,
referring to the authentication information associated with the representative guest terminal to determine whether or not the unlocking request is an unlocking request transmitted by the representative guest terminal when the unlocking request transmitted by the representative guest terminal requesting the unlocking is received from the smart lock, and transmitting a result of the determination to the smart lock, and
at the smart lock, unlocking when the management server determines that the unlocking request is the unlocking request transmitted by the representative guest terminal.

12. The authorization method according to claim 11, further comprising:
at the child guest terminal, generating authentication information referred to when the unlocking of the smart lock is requested, imparting a third signature to the authentication information, and transmitting the authentication information and the third signature to the representative guest terminal,
at the representative guest terminal,
upon successfully verifying the third signature included in information received from the child guest terminal, imparting the first signature to the authentication information of the child guest terminal, and
transmitting the authentication information of the child guest terminal, the third signature of the child guest terminal for the authentication information, and the first signature of the representative guest terminal for the authentication information, in addition to the request for the authorization and registration of the unlocking from the representative guest terminal, to the owner terminal as a request for authorization and registration of the unlocking by the child guest terminal, at the owner terminal, upon successfully verifying the first and third signatures included in the request for the authorization and registration of the unlocking by the child guest terminal received from the representative guest terminal and receiving information for approving the authorization and registration of the unlocking by the child guest terminal by the manager, imparting the second signature to the authentication information of the child guest terminal, and transmitting information included in the request for the authorization and registration of the unlocking by the child guest terminal received from the representative guest terminal and the second signature of the owner terminal for the authentication information of the child guest terminal to the management server together with information included in the request for the authorization and registration of the unlocking from the representative guest terminal and the second signature of the owner terminal for the authentication information of the representative guest terminal, at the management server, upon successfully verifying the first, second, and third signatures included in information received from the owner terminal, storing the representative guest terminal and the child guest terminal in association with each other, storing the authentication information of the child guest terminal and the child guest terminal in association with each other, referring to the authentication information associated with the child guest terminal to determine whether or not the unlocking request is an unlocking request transmitted by the child guest terminal when the unlocking request transmitted by the child guest terminal requesting unlocking is received from the smart lock, and transmits a result of the determination to the smart lock, and unlocking the smart lock when the management server determines that the unlocking request is the unlocking request transmitted by the child guest terminal.

13. The authorization method according to claim 11, further comprising:

at the owner terminal, generating an authorization token indicating that the request for the authorization and registration of the unlocking to the management server is authorized to the representative guest terminal and imparting the second signature to the authorization token, and transmitting the authorization token with the second signature to the management server, at the management server, verifying the second signature imparted to the authorization token received from the owner terminal, and storing the authorization token and the representative guest terminal in association with each other, at the child guest terminal, generating authentication information referred to when the unlocking of the smart lock is requested, imparting the third signature to the authentication information, and transmitting the authentication information and the third signature to the representative guest terminal, at the representative guest terminal, upon successfully verifying the third signature included in information received from the child guest terminal, imparting the first signature to the authentication information of the child guest terminal, and transmitting the authentication information of the child guest terminal, the third signature of the child guest terminal for the authentication information, and the first signature of the representative guest terminal for the authentication information to the management server as a request for authorization and registration of unlocking by the child guest terminal, and at the management server, upon successfully verifying the first and third signatures included in information received from the representative guest terminal, and confirming that the authorization token associated with the representative guest terminal is stored, storing the representative guest terminal and the child guest terminal included in the request for the authorization and registration of the unlocking in association with each other, and storing the authentication information of the child guest terminal and the child guest terminal in association with each other.

14. The authorization method according to claim 11, further comprising:

at the owner terminal, generating an authorization token indicating that the request for the authorization and registration of the unlocking to the management server is authorized to the representative guest terminal and imparting the second signature to the authorization token, and transmitting the authorization token with the second signature to the representative guest terminal, at the representative guest terminal, verifying the second signature imparted to the authorization token received from the owner terminal, and storing the authorization token, at the child guest terminal, generating authentication information referred to when the unlocking of the smart lock is requested, imparting a third signature to the authentication information, and transmitting the authentication information and the third signature to the representative guest terminal, at the representative guest terminal, upon successfully verifying the third signature included in information received from the child guest terminal, imparting the first signature to the authentication information of the child guest terminal, and transmitting the authentication information of the child guest terminal, the third signature of the child guest terminal for the authentication information, the first signature of the representative guest terminal for the authentication information, and the authorization token to which the second signature is imparted to the management server as a request for authorization and registration of unlocking by the child guest terminal, and at the management server, upon successfully verifying the first, second, third signatures included in information received from the representative guest terminal, and successfully verifying that the representative guest terminal authorized by the authorization token is a representative guest terminal requesting the authorization and registration of the unlocking, storing the representative guest terminal and the child guest terminal included in the request for the authorization and registration of the unlocking in association with each other, and store the authentication information of the child guest terminal and the child guest terminal in association with each other.

15. The authorization method according to claim 13, wherein the authorization token includes cancellation of the authorization and registration of the unlocking by the child guest terminal, and the method further comprises:

at the representative guest terminal, requesting the cancellation of the authorization and registration from the child guest terminal, and at the management server, upon successfully verifying that the authorization token corresponding to the representative guest terminal is stored, or successfully verifying the second signature imparted to the authorization token corresponding to the representative guest terminal, the authorization token being included in the request for cancellation of the authorization and registration, deleting the authentication information of the child guest terminal associated with the representative guest.

16. The authorization method according to claim 13, wherein the authorization token includes either of the maximum number of child guest terminals for which authorization and registration of unlocking are allowed and a period in which registration is allowed, and the method further comprises:

at the management server, receiving the request for the authorization and registration of the unlocking up to the maximum number from the representative guest terminal when the authorization token includes the maximum number, receiving the request for the authorization and registration of the unlocking when the authorization token includes the period in which registration is allowed and there is the request from the representative guest terminal in the period in which registration is allowed.

17. The authorization method according to claim 13, wherein the authorization token includes a date and time at which the unlocking is authorized, and the method further comprises:

at the management server, storing the authentication information of the child guest terminal requesting authorization and registration of the unlocking and the child guest terminal in association with the date and time at which the unlocking is authorized when storing the authentication information of the child guest terminal requesting authorization and registration of the unlocking and the child guest terminal in association with each other, and determining whether or not a transmission time of the unlocking request is included in the date and time at which unlocking is authorized, the date and time being stored in association with the child guest terminal, when determining whether or not the unlocking request is an unlocking request that the child guest terminal transmits.

18. The authorization method according to claim 13, further comprising:

at the management server, when the management server receives, from the representative guest terminal, a request for authorization and registration of unlocking by the child guest terminal, inquiring of the owner terminal about approval or disapproval of the authorization and registration of the unlocking before storing the authentication information of the child guest terminal and the child guest terminal in association with each other, at the owner terminal, receiving information indicating approval or disapproval of the authorization and registration of the unlocking from the manager, and transmitting the approval or disapproval to the management server, and at the management server, when the management server receives the approval, storing the authentication information and the child guest terminal in association with each other.

19. The authorization method according to claim 13, at the management server, when the management server receives, from the representative guest terminal, a request for authorization and registration of unlocking by the child guest terminal, storing the representative guest terminal and the child guest terminal in association with each other, storing the authentication information of the child guest terminal and the child guest terminal in association with each other, and then notifying the owner terminal of the authorization and registration of the unlocking, at the owner terminal, receiving information indicating cancellation or non-cancellation of the authorization and registration of the unlocking from the manager, and transmitting cancellation or non-cancellation to the management server, and at the management server, when the management server receives the cancellation, deleting the authentication information stored in association with the child guest terminal.

* * * * *